US012315447B2

(12) United States Patent
Lee et al.

(10) Patent No.: US 12,315,447 B2
(45) Date of Patent: May 27, 2025

(54) PIXEL CIRCUIT AND DISPLAY DEVICE INCLUDING THE SAME

(71) Applicant: LG Display Co., Ltd., Seoul (KR)

(72) Inventors: Yong Won Lee, Paju-si (KR); Ki Young Kwon, Paju-si (KR); Jung Woo Ko, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/506,786

(22) Filed: Nov. 10, 2023

(65) Prior Publication Data

US 2024/0203350 A1 Jun. 20, 2024

(30) Foreign Application Priority Data

Dec. 14, 2022 (KR) ........................ 10-2022-0174447
Oct. 26, 2023 (KR) ........................ 10-2023-0144540

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2310/0262* (2013.01); *G09G 2310/08* (2013.01); *G09G 2320/0233* (2013.01); *G09G 2330/021* (2013.01)

(58) Field of Classification Search
CPC ......... G09G 3/3233; G09G 2300/0819; G09G 2300/0852; G09G 2310/0262; G09G 2310/08; G09G 2320/0233; G09G 2330/021
See application file for complete search history.

(56) References Cited

U.S. PATENT DOCUMENTS 9,029,849 B2 * 5/2015 Kim .................. H10K 59/1216 345/82
2023/0070020 A1 * 3/2023 Son ...................... G09G 3/3233

FOREIGN PATENT DOCUMENTS

KR 20140131637 A 11/2014
KR 20190134105 A 12/2019

* cited by examiner

*Primary Examiner* — Kenneth B Lee, Jr.
(74) *Attorney, Agent, or Firm* — Seed IP Law Group LLP

(57) ABSTRACT

Disclosed is a pixel circuit and a display device including the pixel circuit. The pixel circuit includes a driving element connected to a first node, a second node, and a third node; a first capacitor connected between the second node and a fourth node; a second capacitor connected between the third node and the fourth node; a light emitting element; a first switch element supplying an initialization voltage to the fourth node; a second switch element supplying the initialization voltage to the second node; a third switch element supplying a data voltage to the second node; and a fourth switch element supplying a reference voltage to the third node or to a fifth node connected to an anode electrode of the light emitting element.

20 Claims, 42 Drawing Sheets

PIXEL CIRCUIT AND DISPLAY DEVICE INCLUDING THE SAME

CROSS-REFERENCE TO RELATED APPLICATION

This application claims priority to and the benefit of Korean Patent Application No. 10-2022-0174447 filed Dec. 14, 2022, and 10-2023-0144540 filed Oct. 26, 2023, the disclosure of which are incorporated herein by reference in its entirety.

BACKGROUND

Technical Field

The present disclosure relates to a pixel circuit and a display device including the same.

Description of the Related Art

Electroluminescent display devices are generally classified into inorganic light emitting display devices and organic light emitting display devices according to the materials of light emitting layers. Active matrix type organic light emitting display devices include organic light-emitting diodes (hereinafter referred to as "OLEDs"), which emit light by themselves, and have fast response speeds and advantages in which light emission efficiencies, brightness, and viewing angles are high.

In the organic light-emitting display devices, the OLEDs are formed in pixels. Since the organic light-emitting display devices have fast response speeds and are excellent in light emission efficiency, brightness, and viewing angle as well as being able to exhibit a black gradation in a full black color, the organic light-emitting display devices are excellent in a contrast ratio and color reproducibility.

Pixels of an organic light emitting display (OLED) device include a pixel circuit including a driving element for driving the OLED, and a capacitor connected to the driving element.

Due to process deviations and device characteristic deviations resulting from the manufacturing process of the display panel, there may be differences in the electrical characteristics of the driving element for each pixel. These differences may increase as the driving time of the pixels elapses. In order to compensate for the differences in the electrical characteristics of the driving element for each pixel, an internal compensation circuit may be added to the pixel circuit. The internal compensation circuit may sample a threshold voltage of the driving element and compensate a gate voltage of the driving element by the amount of the threshold voltage of the driving elements.

However, when the pixels driven by the internal compensation circuit are driven at low luminance, luminance unevenness may occur within the screen of the display panel.

BRIEF SUMMARY

The present disclosure has been made in an effort to address aforementioned necessities and/or drawbacks.

The present disclosure provides a pixel circuit that is capable of compensating the threshold voltage of a driving element in real time using an internal compensation circuit and improving the luminance uniformity of the screen, and a display device including the pixel circuit.

The problems or limitations to be solved or addressed by the present disclosure are not limited to those mentioned above, and other problems or limitations not mentioned will be clearly understood by those skilled in the art from the following description.

A pixel circuit according to one embodiment of the present disclosure includes: a driving element including a first electrode connected to a first node to which a pixel driving voltage is applied, a gate electrode connected to a second node, and a second electrode connected to a third node; a first capacitor connected between the second node and a fourth node; a second capacitor connected between the third node and the fourth node; a light emitting element configured to be driven by a current flowing through the driving element; a first switch element configured to be turned on in response to a gate-on voltage of a first gate signal to supply an initialization voltage to the fourth node; a second switch element configured to be turned on in response to a gate-on voltage of a second gate signal to supply the initialization voltage to the second node; a third switch element configured to be turned on in response to a gate-on voltage of a third gate signal to supply a data voltage to the second node; and a fourth switch element configured to be turned on in response to a gate-on voltage of a fourth gate signal. The fourth gate signal is configured to supply a reference voltage to the third node or to a fifth node connected to an anode electrode of the light emitting element.

The data voltage may be stored in the first capacitor, after a threshold voltage of the driving element is stored in the second capacitor.

A cathode voltage is applied to a cathode electrode of the light emitting element. The first to fourth gate signals swing between the gate-on voltage and the gate-off voltage. The first to fourth switch elements are turned off in response to the gate-off voltage. The pixel driving voltage may be higher than the maximum voltage of the data voltage. The cathode voltage may be lower than the minimum voltage of the data voltage. The reference voltage may be lower than the initialization voltage and higher than the cathode voltage. The gate-on voltage may be higher than the pixel driving voltage. The gate-off voltage may be lower than the cathode voltage.

A driving period of the pixel circuit may include: a first period during which the pixel circuit is initialized; a second period during which a threshold voltage of the driving element is stored in the second capacitor; a third period during which the data voltage is stored in the first capacitor; a fourth period during which the reference voltage is applied to the anode electrode of the light emitting element; and a fifth period during which the light emitting element is driven by a current from the driving element.

The first switch element may include a first electrode to which the initialization voltage is applied, a gate electrode to which the first gate signal is applied, and a second electrode connected to the fourth node. The second switch element may include a first electrode to which the initialization voltage is applied, a gate electrode to which the second gate signal is applied, and a second electrode connected to the second node. The third switch element may include a first electrode to which the data voltage is applied, a gate electrode to which the third gate signal is applied, and a second electrode connected to the second node. The fourth switch element may include a first electrode connected to the anode electrode of the light emitting element, a gate electrode to which the fourth gate signal is applied, and a second electrode to which the reference voltage is applied.

A voltage of the first gate signal may be the gate-on voltage during the first to third periods and the gate-off voltage during the fourth and fifth periods. A voltage of the second gate signal may be the gate-on voltage during the first and second periods and the gate-off voltage during the third to fifth periods. A voltage of the third gate signal may be the gate-on voltage synchronized with the data voltage during the third period and the gate-off voltage during the first, second, fourth, and fifth periods. A voltage of the fourth gate signal may be the gate-on voltage during the first and fourth periods and the gate-off voltage during the second, third, and fifth periods.

The pixel circuit may further includes at least one of a fifth switch element and a sixth switch element. The fifth switch element may be turned on in response to a gate-on voltage of a fifth gate signal to supply the pixel driving voltage to the first node. The sixth switch element may be turned on in response to a gate-on voltage of a sixth gate signal to connect the third node to the anode electrode of the light emitting element. A voltage of the fifth gate signal may be the gate-on voltage during the second, third, and fifth periods and the gate-off voltage during the first and fourth periods. A voltage of the sixth gate signal may be the gate-on voltage during the first, fourth, and fifth periods and the gate-off voltage during the second and third periods.

The fifth switch element may include a first electrode to which the pixel driving voltage is applied, a gate electrode to which the fifth gate signal is applied, and a second electrode connected to the first node. The sixth switch element may include a first electrode connected to the third node, a gate electrode to which the sixth gate signal is applied, and a second electrode connected to the anode electrode of the light emitting element.

The pixel circuit may further includes: a fifth switch element configured to be turned on in response to a gate-on voltage of a fifth gate signal to supply the pixel driving voltage to the first node; a sixth switch element configured to be turned on in response to a gate voltage of a sixth gate signal to connect the third node to the fifth node; and a seventh switch element configured to be turned on in response to the gate-on voltage of the fourth gate signal to supply an anode reset voltage to the anode electrode of the light emitting element. The fourth switch element may supply the reference voltage to the third node in response to the gate-on voltage of the fourth gate signal.

A cathode voltage may be applied to a cathode electrode of the light emitting element. The anode reset voltage may be a constant voltage higher than the reference voltage by a voltage between 0 [V] and 1.5 [V]. The first to fourth gate signals may swing between the gate-on voltage and the gate-off voltage. Each of the first to seventh switch elements may be turned off in response to the gate-off voltage.

A driving period of the pixel circuit may include a first period, a second period, a third period, a fourth period, and a fifth period. A voltage of the first gate signal may be the gate-on voltage during the first to third periods and the gate-off voltage during the fourth and fifth periods. A voltage of the second gate signal may be the gate-on voltage during the first and second periods and the gate-off voltage during the third to fifth periods. A voltage of the third gate signal may be the gate-on voltage synchronized with the data voltage during the third period and the gate-off voltage during the first, second, fourth, and fifth periods. A voltage of the fourth gate signal may be the gate-on voltage during the first and fourth periods and the gate-off voltage during the second, third, and fifth periods. A voltage of the fifth gate signal may be the gate-on voltage during the second, third, and fifth periods and the gate-off voltage during the first and fourth periods. A voltage of the sixth gate signal may be the gate-on voltage during the fifth period and the gate-off voltage during the first to fourth periods.

A display device of the present disclosure includes the pixel circuit.

According to the present disclosure, it is possible to secure sufficient time for sensing the threshold voltage by temporally separating a step of sensing the threshold voltage of the driving element and a step of writing the pixel data to the pixels, thereby accurately compensating the threshold voltage of the driving element when driving the pixels of the display panel at high speed and improving the luminance uniformity throughout the screen.

According to the present disclosure, it is possible to prevent the error component from being charged to the main node of the pixel circuit by separating the capacitor storing the threshold voltage of the driving device and the capacitor storing the data voltage.

According to the present disclosure, it is possible to minimize the difference in luminance of the pixels when the driving frequency of the pixels is changed as the refresh rate varies by setting the anode reset voltage separately from the reference voltage.

According to the present disclosure, it is possible to set the cathode voltage to 0 [V] by setting the anode reset voltage separately from the reference voltage, thereby realizing low-power driving of the display device.

According to the present disclosure, the gate drivers and the level shifters are shared in the driving circuits of the display panels in which different pixels are designed. For example, in the present invention, one shift register and four edge triggers may be used to output pulses of the first to the fifth gate signals in the present invention, and they may be shared in other pixel circuits.

Effects which can be achieved by the present disclosure are not limited to the above-mentioned effects. That is, other objects that are not mentioned may be obviously understood by those skilled in the art to which the present disclosure pertains from the following description.

BRIEF DESCRIPTION OF THE SEVERAL VIEWS OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
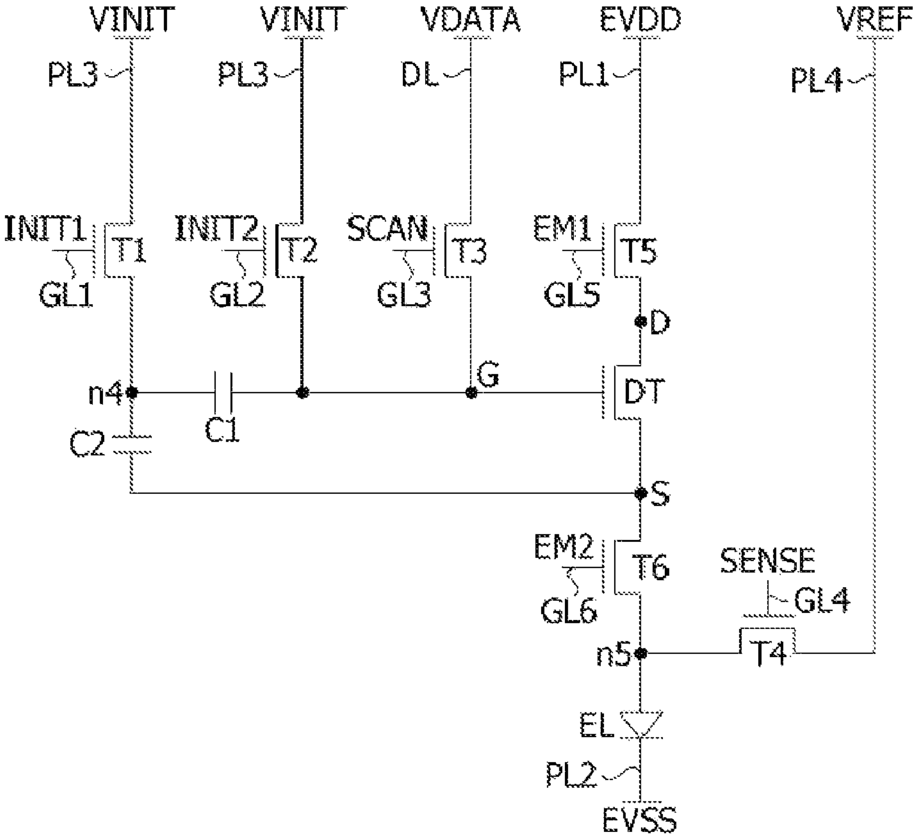
FIG. 1 is a circuit diagram illustrating a pixel circuit according to a first embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as “comprising.” “including.” “having.” and “consist of” used herein are generally intended to allow other components to be added unless the terms are used with the term “only.” Any references to singular may include plural unless expressly stated otherwise.

Components are interpreted to include an ordinary error range even if not expressly stated.

When a positional or interconnected relationship is described between two components, such as “on top of” “above,” “below,” “next to,” “connect or couple with” “crossing,” “intersecting.” or the like, one or more other components may be interposed between them, unless “immediately” or “directly” is used.

When a temporal antecedent relationship is described, such as “after,” “following,” “next to,” “before,” or the like, it may not be continuous on a time base unless “immediately” or “directly” is used.

The terms “first,” “second,” and the like may be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

The pixel circuit and the gate drive circuit of the display device may include a plurality of transistors. Each of the sub-pixels includes a pixel circuit. The plurality of transistors are used as switch elements or driving elements. The transistor may be implemented as a TFT (Thin Film Transistor). The transistors may be implemented as an oxide thin film transistor (TFT) including an oxide semiconductor, a low temperature poly silicon TFT (LTPS TFT) including a low temperature poly silicon, and the like. Hereinafter, transistors constituting the pixel circuit and the gate driving circuit will be described focusing on an example implemented with an n-channel oxide TFT, but the present disclosure is not limited thereto.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In the case of an n-channel transistor, the gate-on voltage may be a gate high voltage, and the gate-off voltage may be a gate low voltage.

Hereinafter, various embodiments of the present disclosure will be described in detail with reference to the accompanying drawings.

Figure 2:
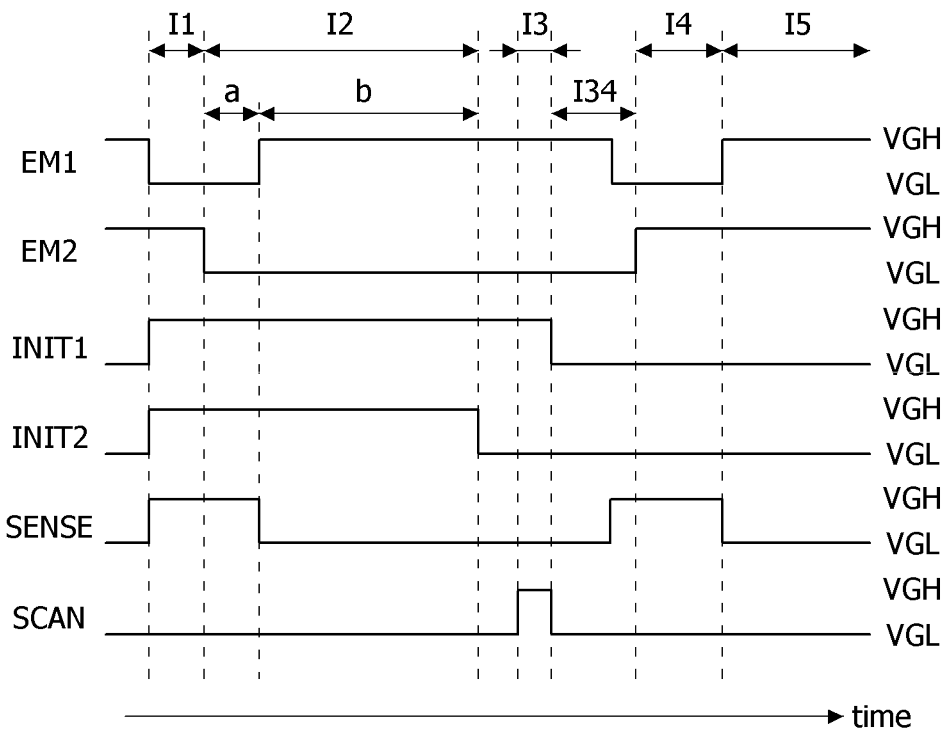
FIG. 2 is a waveform diagram illustrating waveforms of gate signals applied to the pixel circuit shown in FIG. 1.

FIG. 1 is a circuit diagram illustrating a pixel circuit according to a first embodiment of the present disclosure. FIG. 2 is a waveform diagram illustrating waveforms of gate signals applied to the pixel circuit shown in FIG. 1.

Referring to FIGS. 1 and 2, the pixel circuit includes an emitting element EL, a driving element DT driving the emitting element EL, a plurality of switch elements T1 to T6, a first capacitor C1, and a second capacitor C2. The driving element DT and the switch elements T1 to T6 may be implemented as n-channel oxide TFTs.

The pixel circuit is connected to a data line DL to which a data voltage VDATA is applied, and to gate lines GL1 through GL6 to which gate signals INIT1, INIT2, SCAN, SENSE, EM1, and EM2 are applied. The pixel circuit is connected to power nodes to which DC voltages (or constant voltages) are applied, such as a first constant voltage node PL1 to which a pixel driving voltage EVDD is applied, a second constant voltage node PL2 to which a cathode voltage EVSS is applied, a third constant voltage node PL3 to which an initialization voltage VINIT is applied, and a fourth constant voltage node PL4 to which a reference voltage VREF is applied. On the display panel, the power lines to which the constant voltage nodes are connected may be commonly connected to all of pixels.

The pixel driving voltage EVDD is set to a voltage that is higher than the maximum voltage of the data voltage VDATA and that enables the driving element DT to operate in a saturation region. The initialization voltage VINIT may be set to a voltage that enables the driving element DT to turn on within a voltage range between the maximum and minimum voltage of the data voltage VDATA. The cathode voltage EVSS is set to a voltage lower than the minimum voltage of the data voltage VDATA. The reference voltage VREF may be set to a voltage lower than the initialization voltage VINIT and higher than the cathode voltage EVSS. A gate-on voltage VGH may be set to a voltage higher than the pixel driving voltage EVDD, and a gate-off voltages VGL may be set to a voltage lower than the cathode voltage EVSS. EVDD=12[V], EVSS=6[V]. VGH=20[V], VGL=–14[V], VINIT=1[V], VREF=–4[V] may be set, but are not limited to. For example, the constant voltages may be a voltage selected within a voltage range of 8[V] to 20[V] for EVDD, a voltage selected within a voltage range of –8[V] to –0.5[V] for EVSS, a voltage selected within a voltage range of 0.5[V] to 24[V] for VGH, a voltage selected within a voltage range of –20[V] to –0.5[V] for VGL, a voltage selected within a voltage range of 0.5[V] to 3[V] for VINIT, and a voltage selected within a voltage range of –6[V] to –0.5[V] for VREF, depending on the structure, driving characteristics, and use environment of the display panel.

The gate signals INIT1, INIT2, SCAN, SENSE, EM1, and EM2 include pulses that swing between the gate-on voltage VGH and the gate-off voltage VGL. The gate signals INIT1, INIT2, SCAN, SENSE, EM1, and EM2 include a first gate signal INIT1, a second gate signal INIT2, a third gate signal SCAN, a fourth gate signal SENSE, a fifth gate signal EM1, and a sixth gate signal EM2.

A driving period of the pixel circuit is determined by the waveforms of the gate signals INIT1, INIT2, SCAN, SENSE, EM1, and EM2 and may be divided into first to fifth periods I1 to I5, which are adjustable.

A voltage of the first gate signal INIT1 is a pulse of the gate-on voltage VGH during the first to third periods I1 to I3 and is generated as a pulse of the gate-off voltage VGL during the fourth and fifth periods I4 and I5. A voltage of the second gate signal INIT2 is generated as a pulse of the gate-on voltage VGH during the first and second periods I1 and I2 and is the gate-off voltage VGL during the third to fifth periods I3 to I5.

A voltage of the third gate signal SCAN is the gate-off voltage VGL during the first and second periods I1 and I2 and is generated as a pulse of the gate-on voltage VGH synchronized with the data voltage VDATA of the pixel data during the third period I3. The voltage of the third gate signal SCAN is the gate-off voltage VGL during the fourth and fifth periods I4 and I5.

A voltage of the fourth gate signal SENSE is generated as a pulse of the gate-on voltage VGH during the first period I1 and is the gate-off voltage VGL during the second and third periods I2 and I3. The voltage of the fourth gate signal SENSE is generated as a pulse of the gate-on voltage VGH during the fourth period I4 and is the gate-off voltage VGL during the fifth period I5. The second period I2 may be divided into a second-first period (a) and a second-second period (b). In this case, a first pulse of the fourth gate signal SENSE may be extended, and thus the voltage of the fourth gate signal SENSE may be the gate-on voltage VGH during the second-first period (a) and the gate-off voltage VGL during the second-second period (b).

A voltage of the fifth gate signal EM1 may be a gate-off voltage VGL during the first period I1 and may be generated as a pulse of a gate-on voltage VGH during the second and third periods I2 and I3. The voltage of the fifth gate signal EM1 is the gate-off voltage VGL during the fourth period I4 and the gate-on voltage VGH during the fifth period I5. The second period I2 may be divided into a second-first period (a) and a second-second period (b). In this case, the voltage of the fifth gate signal EM1 may be the gate-off voltage VGL during the second-first period (a) and the gate-on voltage VGH during the second-second period (b).

A voltage of the sixth gate signal EM2 may be the gate-on voltage VGH during the first period I1 and the gate-off voltage VGL during the second and third periods I2 and I3. The voltage of the sixth gate signal EM2 is the gate-on voltage VGH during the fourth and fifth periods I4 and I5.

A pre-anode reset period I34 may be set between the third period I3 and the fourth period I4. Within the pre-anode reset period I34, an anode reset of the light emitting element EL may be initiated to extend the initialization time of the anode voltage. The pre-anode reset period I34 may improve an anode reset effect in a low-speed driving mode. Within the pre-anode reset period I34, the first gate signal INIT1 may be inverted to the gate-off voltage VGL and then the fourth gate signal SENSE may be inverted to the gate-on voltage VGH. Within the pre-anode reset period I34, when the fourth gate signal SENSE is inverted to the gate-on voltage VGH, the fifth gate signal EM1 may be inverted to the gate-off voltage VGL.

The driving element DT generates a current according to a gate-source voltage Vgs to drive the light emitting element EL. The driving element DT includes a first electrode connected to a first node D, a gate electrode connected to a second node G, and a second electrode connected to a third node S. The first node D may be connected to the first constant voltage node PL1 to which the pixel driving voltage EVDD is applied.

The light emitting element EL may be implemented as an OLED. The light emitting element EL includes an anode electrode, a cathode electrode, and an organic compound layer formed between the electrodes. The anode electrode of the light emitting element EL is connected to a fifth node n5, and the cathode electrode is connected to the second constant voltage node PL2 to which the cathode voltage EVSS is applied. The organic compound layer may include, but is not limited to, a hole injection layer (HIL), a hole transport layer (HTL), an light emission layer (EML), an electron transport layer (ETL), and an electron injection layer (EIL). When a voltage is applied to the anode and cathode electrodes of the light emitting element EL, holes passing through the hole transport layer (HTL) and electrons passing through the electron transport layer (ETL) move to the emission layer (EML) to form excitons. In this case, visible light is emitted from the light emission layer EML. The light emitting element EL may be implemented as a tandem structure with a plurality of light emitting layers stacked on top of each other. The light emitting element EL having the tandem structure may improve the luminance and lifespan of pixels.

A threshold voltage Vth of the driving element DT is stored in the second capacitor C2, and then the data voltage VDATA of the pixel data is stored in the first capacitor C1. The first capacitor C1 is connected between the second node G and a fourth node n4 to store the data voltage VDATA during the third period I3. The second capacitor C2 is connected between the third node S and the fourth node n4 to store the threshold voltage Vth of the driving element DT sensed during the second period I2. The second period I2 may be divided into a second-first period (a) and a second-second period (b). The first and second capacitors C1 and C2 may be designed to have the same capacitance, but they are not limited to the same capacitance.

The switch elements T1 to T6 of the pixel circuit include a first switch element T1 that supplies the initialization voltage VINIT to the fourth node n4 in response to the first gate signal INIT1, a second switch element T2 that supplies the initialization voltage VINIT to the second node G in response to a second gate signal INIT2, a third switch element T3 that supplies the data voltage VDATA of the pixel data to the second node G in response to the third gate signal SCAN, a fourth switch element T4 that supplies the reference voltage VREF to a fifth node n5 in response to the fourth gate signal SENSE, a fifth switch element T5 that supplies the pixel driving voltage EVDD to the first node D in response to the fifth gate signal EM1, and a sixth switch element T6 that connects the third node S to the fifth node n5 in response to the sixth gate signal EM2.

The first switch element T1 is turned on in response to a pulse of the first gate signal INIT1 generated as the gate-on voltage VGH during the first to third periods I1 to I3. When the first switch element T1 is turned on, the initialization voltage VINIT is applied to the fourth node n4. The first switch element T1 is turned off during the fourth and fifth periods I4 and I5. The first switch element T1 may remain at the OFF state during the pre-anode reset period I34. The first switch element T1 includes a first electrode connected to the third constant voltage node PL3 to which the initialization voltage VINIT is applied, a gate electrode connected to the first gate line GL1 to which the first gate signal INIT1 is applied, and a second electrode connected to the fourth node n4.

The second switch element T2 is turned on in response to a pulse of the second gate signal INIT2 generated as the gate-on voltage VGH during the first and second periods I1 and I2. When the second switch element T2 is turned on, the initialization voltage VINIT is applied to the second node G. The second switch element T2 is turned off during the third to fifth periods I3 to I5. The second switch element T2 may remain at the OFF state during the pre-anode reset period I34. The second switch element T2 includes a first electrode connected to the third constant voltage node PL3 to which the initialization voltage VINIT is applied, a gate electrode connected to the second gate line GL2 to which the second gate signal INIT2 is applied, and a second electrode connected to the second node G.

The third switch element T3 is turned on in response to a pulse of the third gate signal SCAN synchronized to the data voltage VDATA of the pixel data during the third period I3. The third switch element T3 is turned off during the first period I1, the second period I2, the fourth period I4, and the fifth period I5. When the third switch element T3 is turned on, the data line DL is electrically connected to the second node G and the data voltage VDATA is applied to the second node G. The third switch element T3 may remain at the OFF state during the pre-anode reset period I34. The third switch element T3 includes a first electrode connected to the data line DL to which the data voltage VDATA is applied, a gate electrode connected to the third gate line GL3 to which the third gate signal SCAN is applied, and a second electrode connected to the second node G.

The fourth switch element T4 is turned on in response to a pulse of the fourth gate signal SENSE generated as the gate-on voltage VGH during the first and fourth periods I1 and I4. The fourth switch element T4 is turned off during the second period I2, the third period I3, and the fifth period I5. The second period I2 may be divided into a second-first period (a) and a second-second period (b). In this case, the fourth switch element T4 may be turned on in the second-first period (a) by the fourth gate signal SENSE generated as the gate-on voltage VGH in the second-first period (a), and then turned off in the second-second period (b). The fourth switch element T4 may remain at the OFF state during the pre-anode reset period I34 and then be turned on prior to the fourth period I4. The fourth switch element T4 includes a first electrode connected to the fifth node n5, a gate electrode connected to the fourth gate line GL4 to which the fourth gate signal SENSE is applied, and a second electrode connected to the fourth constant voltage node PL4 to which the reference voltage VREF is applied.

The fifth switch element T5 is turned on in response to a pulse of the fifth gate signal EM1 generated as the gate-on voltage VGH during the second period I2, the third period I3, and the fifth period I5 to supply the pixel driving voltage EVDD to the first node D. The fifth switch element T5 is turned off during the first period I1 and the fourth period I4. The second period I2 may be divided into a second-first period (a) and a second-second period (b). In this case, the fifth switch element T5 may be turned off in the second-first period (a) and then turned on in the second-second period (b). The fifth switch element T5 may further remain at the ON state during the pre-anode reset period I34 and then turn off prior to the fourth period I4. The fifth switch element T5 includes a first electrode connected to the first constant voltage node PL1 to which the pixel driving voltage EVDD is applied, a gate electrode connected to the fifth gate line GL5 to which the fifth gate signal EM1 is applied, and a second electrode connected to the first node D.

The sixth switch element T6 is turned on in response to a pulse of the sixth gate signal EM2 generated as the gate-on voltage VGH during the first period I1, the fourth period I4, and the fifth period I5. When the sixth switch element T6 is turned on, the third node S is electrically connected to the fifth node n5 so that the current from the driving element DT can flow through the light emitting element EL. The sixth switch element T6 is turned off during the second and third periods I2 and I3. The sixth switch element T6 includes a first electrode connected to the third node S, a gate electrode connected to a sixth gate line GL6 to which the sixth gate signal EM2 is applied, and a second electrode connected to the fifth node n5.

FIGS. 3A to 6B are diagrams illustrating driving periods of the pixel circuit shown in FIG. 1 in stages.

Figure 3A:
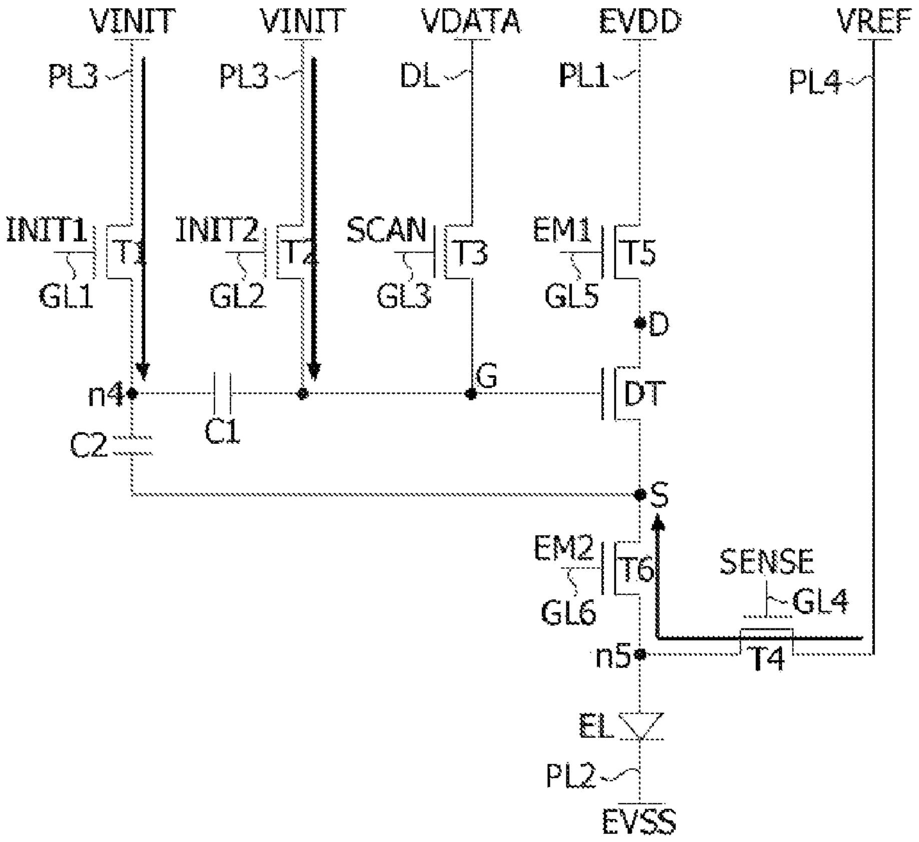
FIGS. 3A to 6B are diagrams illustrating driving periods of the pixel circuit shown in FIG. 1 in stages.

FIG. 3A is a circuit diagram illustrating a current flowing through the pixel circuit during the first period I1.

Figure 3B:
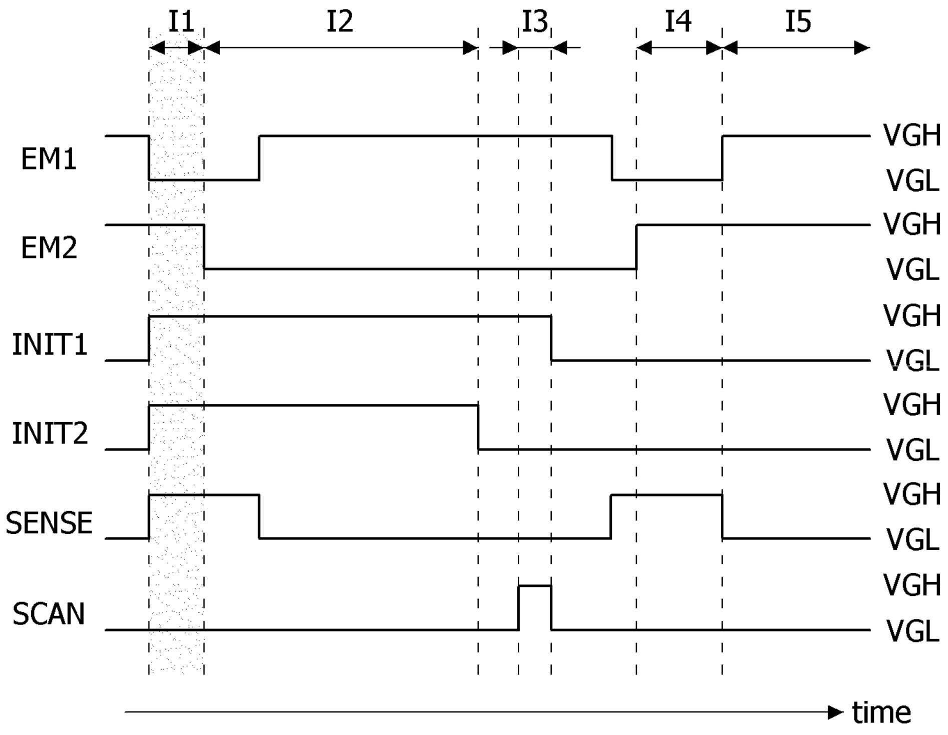

Referring to FIGS. 3A and 3B, during the first period I1, the main nodes of the pixel circuit are initialized. During the first period I1, the voltage of the first gate signal INIT1, the second gate signal INIT2, the fourth gate signal SENSE, and the sixth gate signal EM2 is the gate-on voltage VGH. During the first period I1, the voltage of the third gate signal SCAN and the fifth gate signal EM1 is the gate-off voltage VGL. Therefore, during the first period I1, the first, second, fourth, and sixth switch elements T1, T2, T4, and T6 are turned on, and the third and fifth switch elements T3 and T5 are turned off. As a result, during the first period I1, the voltage of the second node G is initialized to the initialization voltage VINIT and the voltage of the third node S is initialized to the reference voltage VREF. At the end of the first period I1, the gate-source voltage Vgs of the driving element DT and the voltage of the second capacitor C2 are VINIT−VREF. During the first period I1, the driving element DT may be turned on. The light emitting element EL does not emit light during the first period I1 because an anode voltage is the reference voltage VREF lower than the threshold voltage of the light emitting element EL. During the first period I1, the voltage of the first capacitor C1 is 0 [V].

Figure 4A:
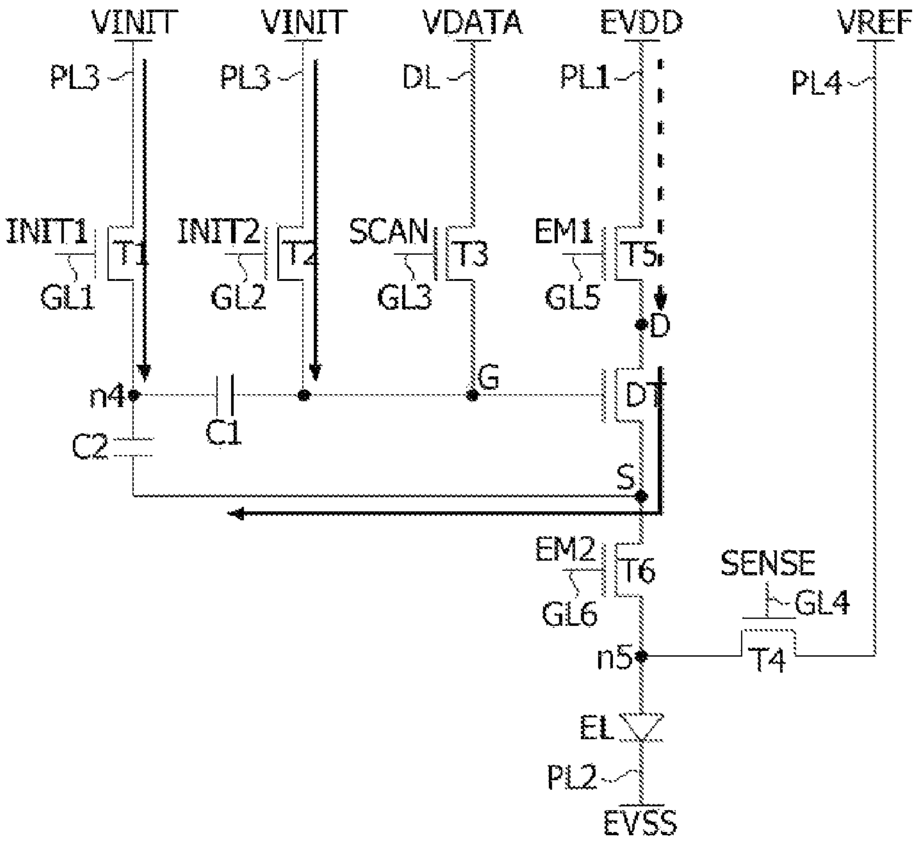

FIG. 4A is a circuit diagram illustrating a current flowing through the pixel circuit during the second period I2.

Figure 4B:
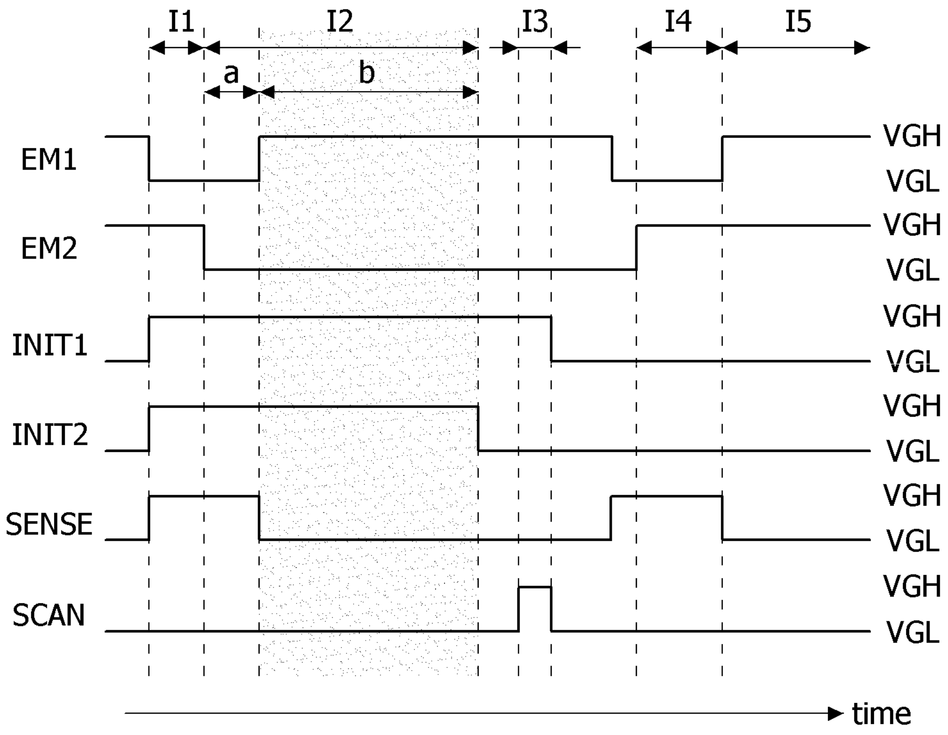

Referring to FIGS. 4A and 4B, during the second period I2, the threshold voltage Vth of the driving element DT is sensed and stored in the second capacitor C2. During the second period I2, the voltage of the first gate signal INIT1, the second gate signal INIT2, and the fifth gate signal EM1 is the gate-on voltage VGH. During the second period I2, the voltage of the third gate signal SCAN, the fourth gate signal SENSE, and the sixth gate signal EM2 is the gate-off voltage VGL. In order to obtain an extended initialization time of the anode voltage of the light emitting element EL, the voltage of the fourth gate signal SENSE may remain at the gate-on voltage VGH during the second-first period (a) and then be inverted to the gate-off voltage VGL during the second-second period (b). The voltage of the fifth gate signal EM1 may remain at the gate off voltage VGL during the second-first period (a) and then be inverted to the gate-on voltage VGH during the second-second period (b). During the second period I2, the first, second, and fifth switch elements T1, T2, and T5 are turned on, and the third, fourth, and sixth switch elements T3, T4, and T6 are turned off. During the second period I2, the driving element DT is turned off when the voltage of the second capacitor C2, in which the gate-source voltage Vgs of the driving element DT is stored, reaches the threshold voltage Vth of the driving element DT.

At the end of the second period I2, the voltage of the second node G is the initialization voltage VINIT, and the voltage of the third node S is VINIT−Vth. Since the fifth node n5 is floating during the second period I2, the light emitting element EL does not emit light during the second period I2 because the anode voltage is the reference voltage VREF. During the second period I2, the voltage of the first capacitor C1 is 0 [V].

Figure 5A:
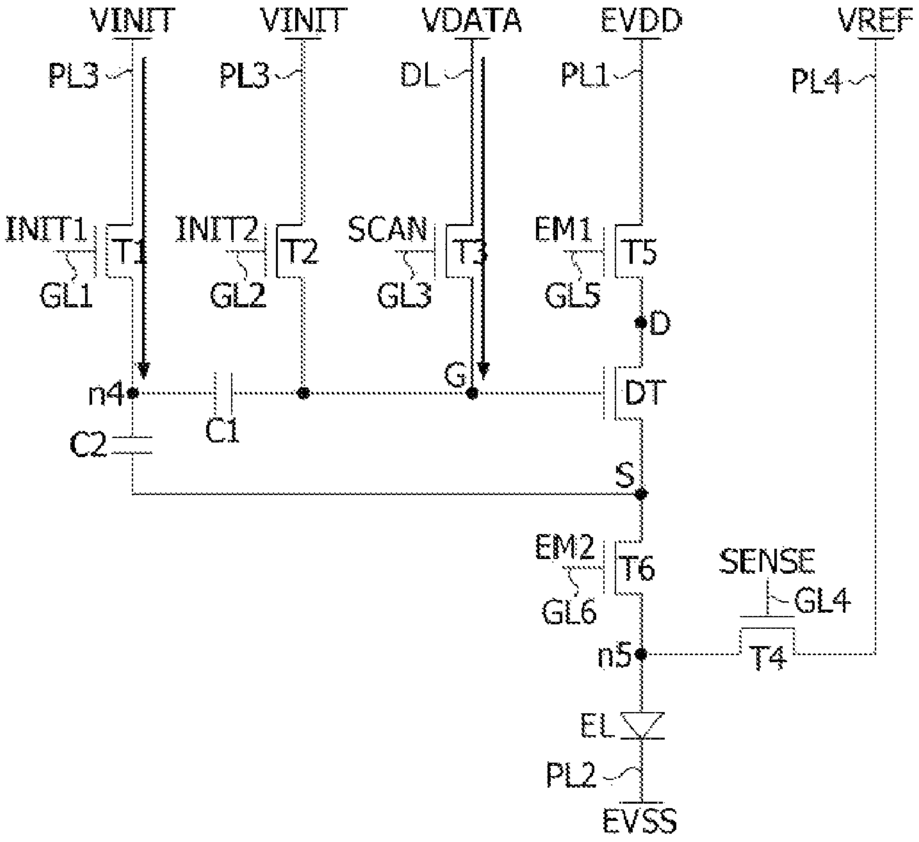

FIG. 5A is a circuit diagram illustrating a current flowing through the pixel circuit during the third period I3.

Figure 5B:
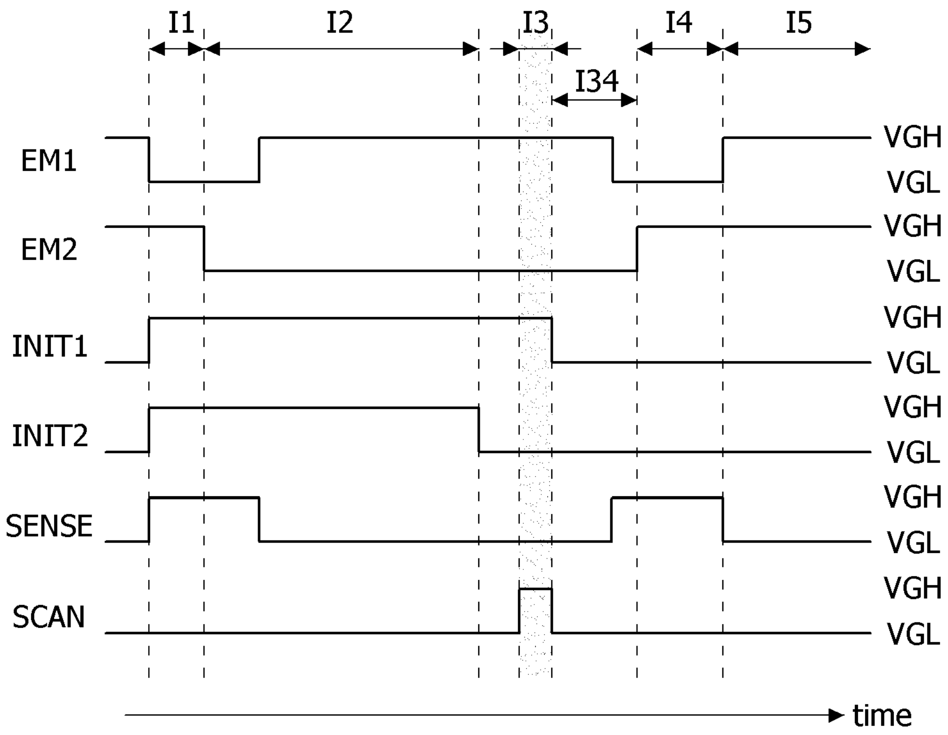

Referring to FIG. 5A and FIG. 5B, during the third period I3, the data voltage VDATA of the pixel data is stored in the first capacitor C1. During the third period I3, the voltage of the first gate signal INIT1, the third gate signal SCAN, and the fifth gate signal EM1 is the gate-on voltage VGH. During the third period I3, the voltage of the second gate signal INIT2, the fourth gate signal SENSE, and the sixth gate signal EM2 is the gate-off voltage VGL. During the third period I3, the first, third, and fifth switch elements T1, T3, and T5 are turned on, and the second, fourth, and sixth switch elements T2, T4, and T6 are turned off. During the third period I3, the data voltage VDATA is applied to the second node G and the initialization voltage VINIT is applied to the fourth node n4. Therefore, at the end of the third period I3, the voltage of the first capacitor C1 is VDATA−VINIT. During the third period I3, the voltage of the third node S is VINIT−Vth, and the voltage of the second capacitor C2 is the threshold voltage Vth of the driving element DT. At the end of the third period I3, the gate-source voltage Vgs of the driving element DT is VDATA−VINIT+Vth.

A frame frequency of the input image may be reduced to a frequency of a low-speed driving mode condition. In the low-speed driving mode, the voltage of the third node S may be discharged, causing the gate-source voltage of the driving element DT to change. In the fourth period I4, the anode voltage of the light emitting element EL may be initialized to the reference voltage VREF and the reference voltage VREF may be supplied to the third node S to suppress the fluctuation of the gate-source voltage Vgs of the driving element DT in the low-speed driving mode.

During the fourth period I4, the voltage of the fourth gate signal SENSE and the sixth gate signal EM2 is the gate-on voltage VGH. During the fourth period I4, the voltage of the first gate signal INIT1, the second gate signal INIT2, the third gate signal SCAN, and the fifth gate signal EM1 is the gate off voltage VGL. During the fourth period I4, the fourth and sixth switch elements T4 and T6 are turned on, and the first, second, third, and fifth switch elements T1, T2, T3, and T5 are turned off.

The pre-anode reset period I34 may extend the time of the fourth period I4 for applying the reference voltage, thereby increasing the anode reset effect. During the pre-anode reset period I34 prior to the fourth period I4, the fourth gate signal SENSE may be inverted to the gate-on voltage VGH. On the other hand, the pre-anode reset period I34 and the fourth period I4 may be omitted in the case of a display device driven at a frame frequency of, for example, 120 Hz in a normal driving mode without the low-speed driving mode.

Figure 6A:
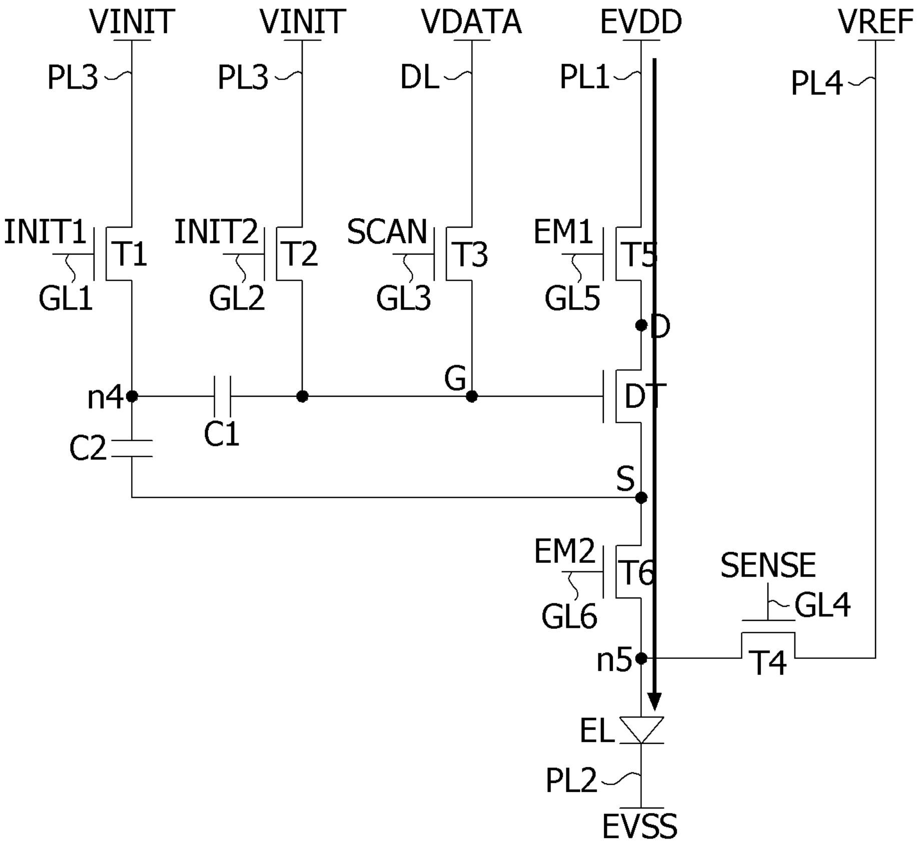

FIG. 6A is a circuit diagram illustrating the current flowing through the pixel circuit during the fifth period I5.

Figure 6B:
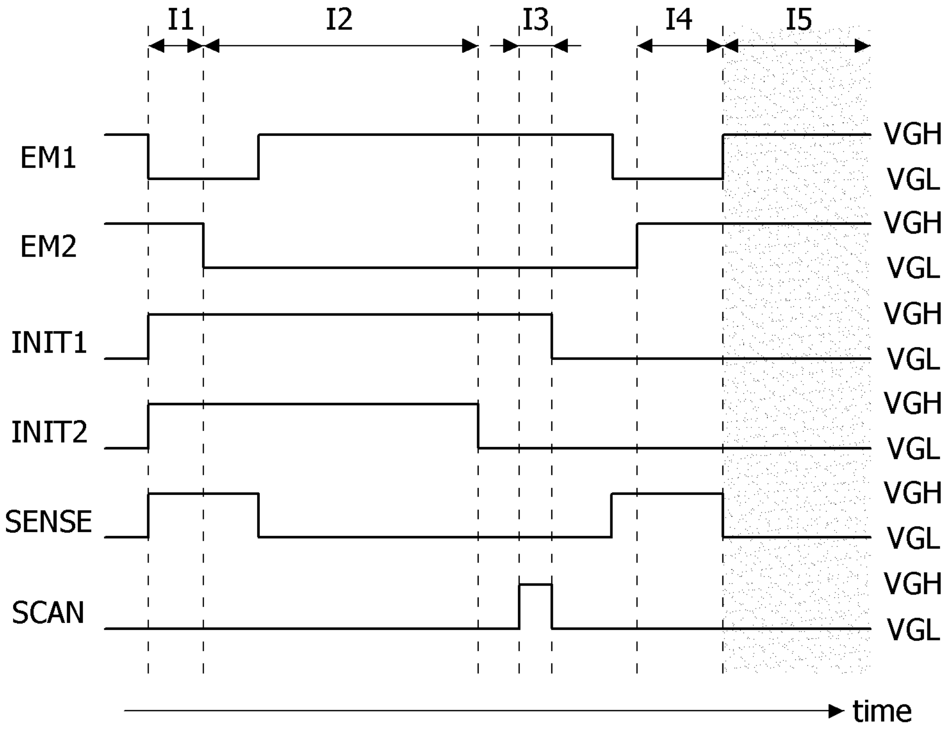

Referring to FIGS. 6A and 6B, during the fifth period I5, the driving element DT generates a current according to the gate-source voltage Vgs to drive the light emitting element EL. The light emitting element EL may emit light at a luminance corresponding to a gray scale value of the pixel data by the current flowing through the driving element DT.

During the fifth period I5, the voltage of the fifth and sixth gate signals EM1 and EM2 is the gate-on voltage VGH, and the voltage of the other gate signals INIT1, INIT2, SCAN, and SENSE is the gate-off voltage VGL. During the fifth period I5, the fifth and sixth switch elements T5 and T6 are turned on, and the first to fourth switch elements T1 to T4 are turned off. During the fifth period I5, the voltage of the second node G is VDATA+Voled, and the voltage of the third node S is VINIT−Vth+Voled. Here, Voled is the anode voltage when the light emitting element EL emits light. Therefore, during the fifth period I5, the gate-source voltage Vgs of the driving element DT is VDATA−VINIT+Vth. During the fifth period I5, the voltage of the first capacitor C1 is VDATA−VINIT, and the voltage of the second capacitor C2 is the threshold voltage Vth of the driving element DT.

Figure 7:
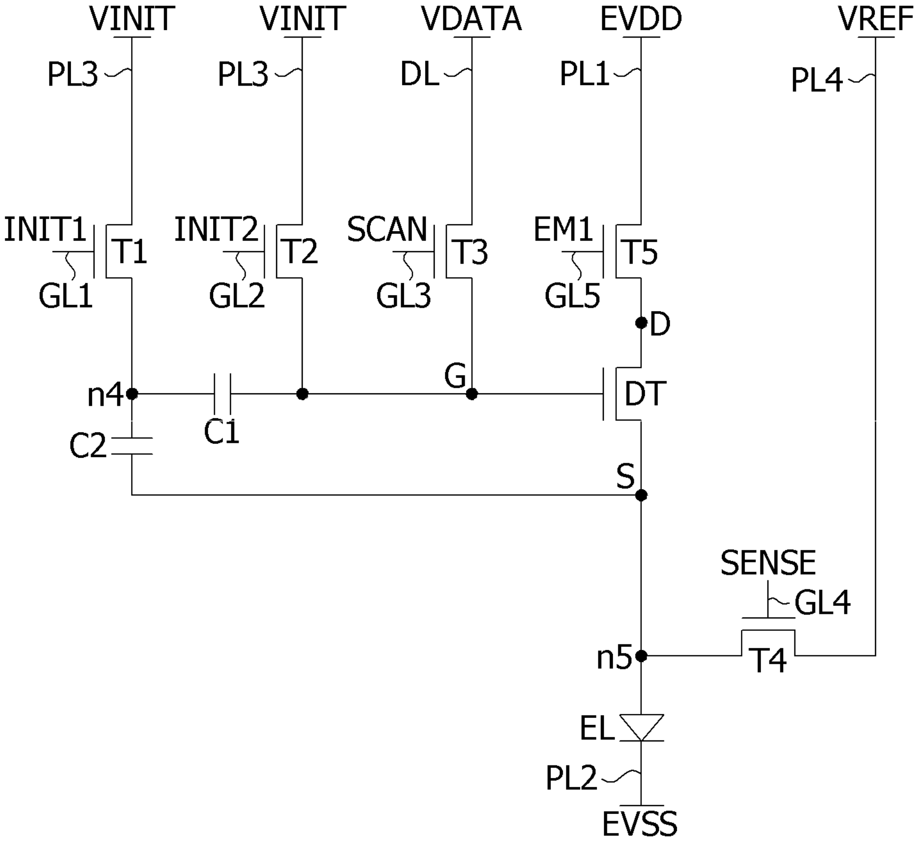
FIG. 7 is a circuit diagram illustrating a pixel circuit according to a second embodiment of the present disclosure.
Figure 8:
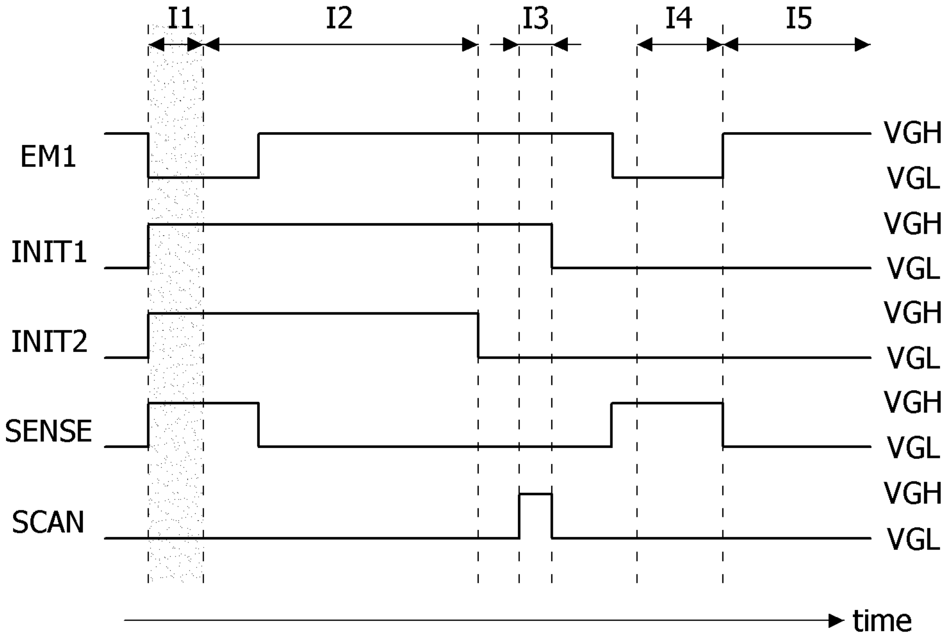
FIG. 8 is a waveform diagram illustrating waveforms of gate signals applied to the pixel circuit shown in FIG. 7.

FIG. 7 is a circuit diagram illustrating a pixel circuit according to a second embodiment of the present disclosure. FIG. 8 is a waveform diagram illustrating waveforms of gate signals applied to the pixel circuit shown in FIG. 7. In the second embodiment, substantially the same components as in the first embodiment described above and detailed descriptions thereof are omitted. In the second embodiment, the pixel circuit is driven without the sixth switch element T6.

Referring to FIGS. 7 and 8, the pixel circuit includes a light emitting element EL, a driving element DT that drives the light emitting element EL, a plurality of switch elements T1 to T5, a first capacitor C1, and a second capacitor C2. The driving element DT and the switch elements T1 to T5 may be implemented as n-channel oxide TFTs.

The gate signals INIT1, INIT2, SCAN, SENSE, and EM1 include a first gate signal INIT1, a second gate signal INIT2, a third gate signal SCAN, a fourth gate signal SENSE, and a fifth gate signal EM1. The waveforms of the gate signals INIT1, INIT2, SCAN, SENSE, and EM1 are substantially the same as in the first embodiment described above. The first to fifth switch elements T1 to T5 and the first capacitor C1 are substantially the same as in the first embodiment described above.

The driving element DT includes a first electrode connected to a first node D, a gate electrode connected to a second node G, and a second electrode connected to a third node S. The first node D may be connected to a first constant voltage node PL1 to which a pixel driving voltage EVDD is applied. An anode electrode of the light emitting element EL is connected to the third node S, and a cathode electrode thereof is connected to a second constant voltage node PL2 to which a cathode voltage EVSS is applied.

The first capacitor C1 is connected between the second node G and a fourth node n4, and the second capacitor C2 is connected between the third node S and the fourth node n4.

A fourth switch element T4 includes a first electrode connected to the third node S, a gate electrode connected to a fourth gate line GL4 to which the fourth gate signal SENSE is applied, and a second electrode connected to a fourth constant voltage node PL4 to which a reference voltage VREF is applied.

Figure 9:
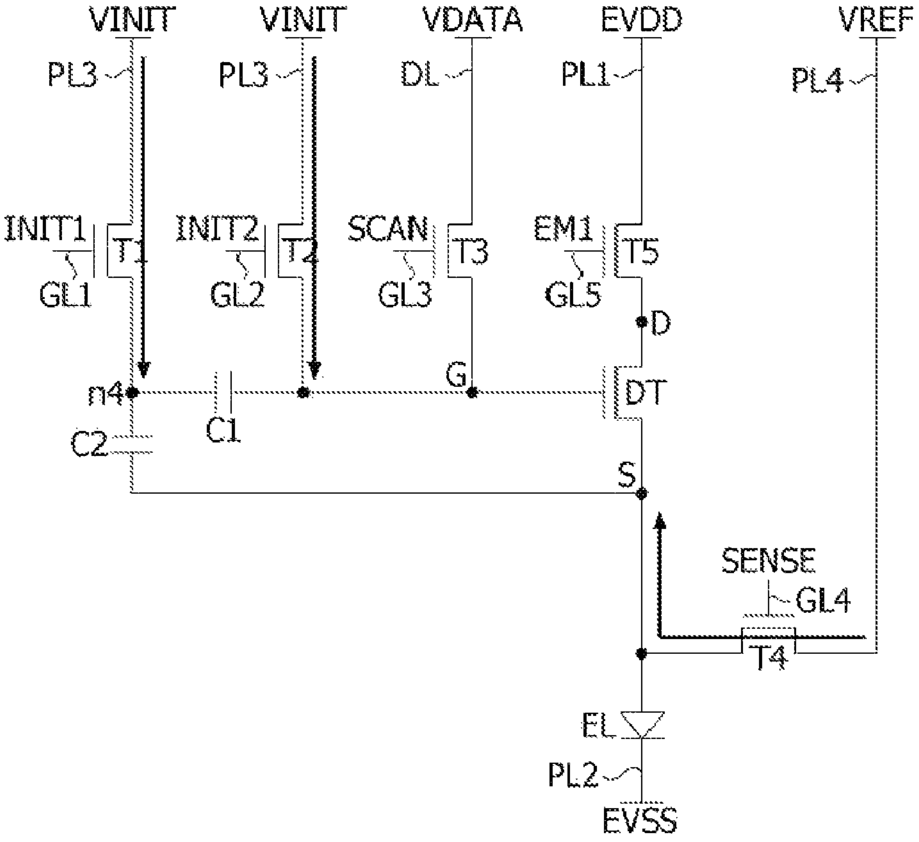
FIGS. 9 to 12 are diagrams illustrating operations of the pixel circuit shown in FIG. 7 in stages.
Figure 10:
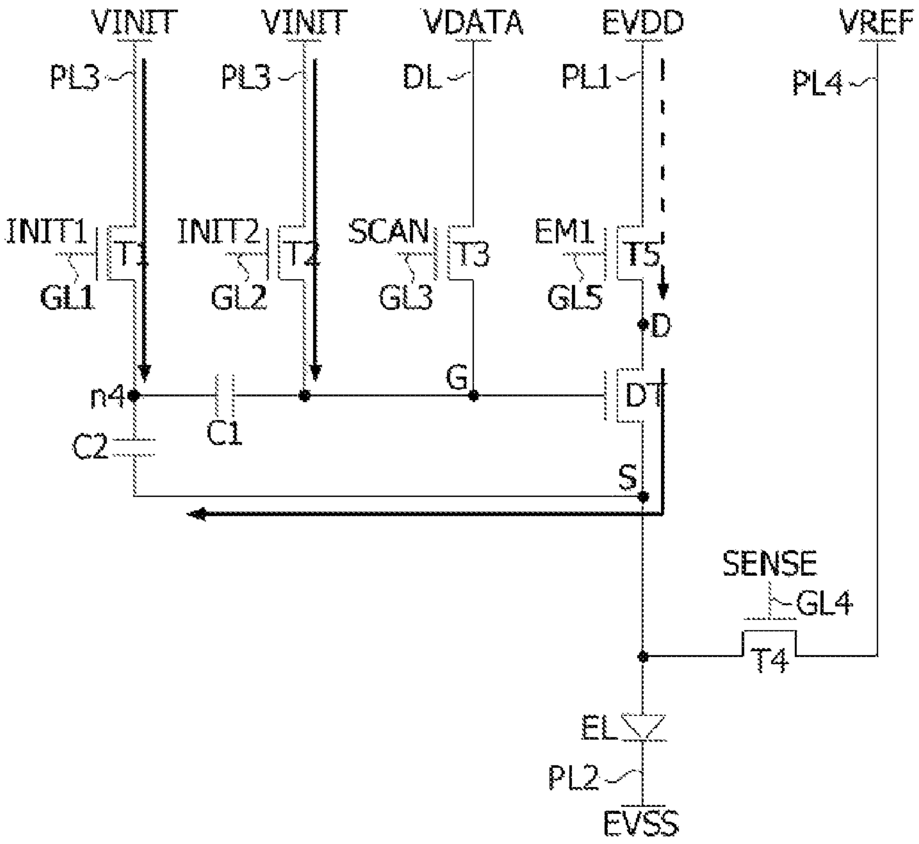
Figure 11:
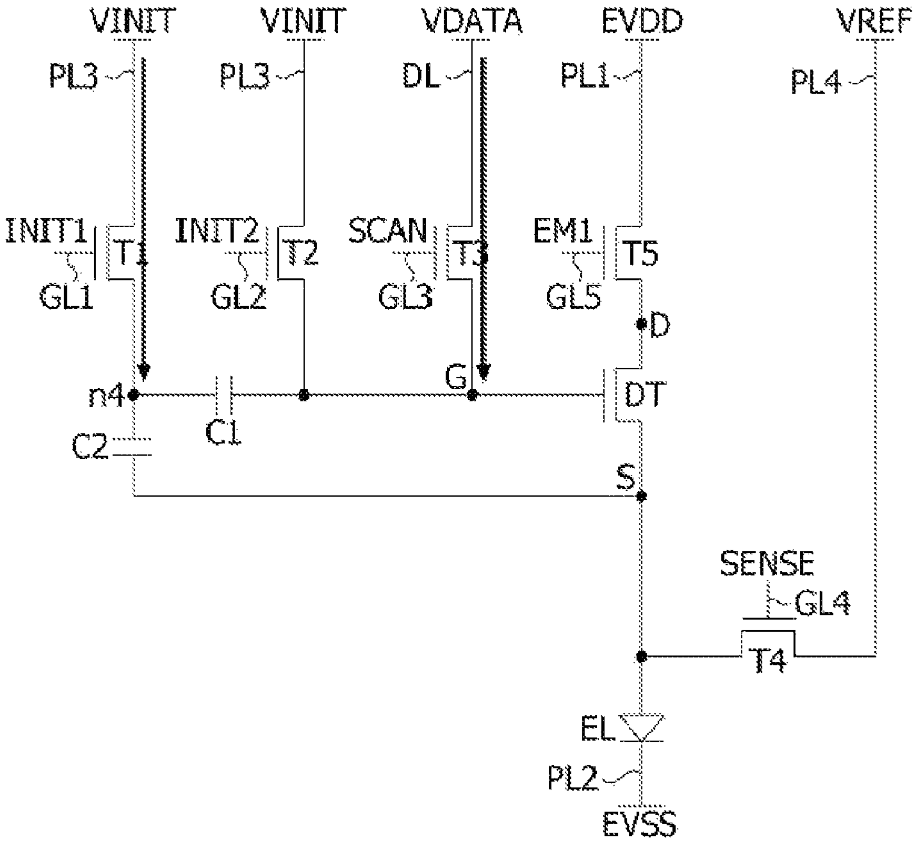
Figure 12:
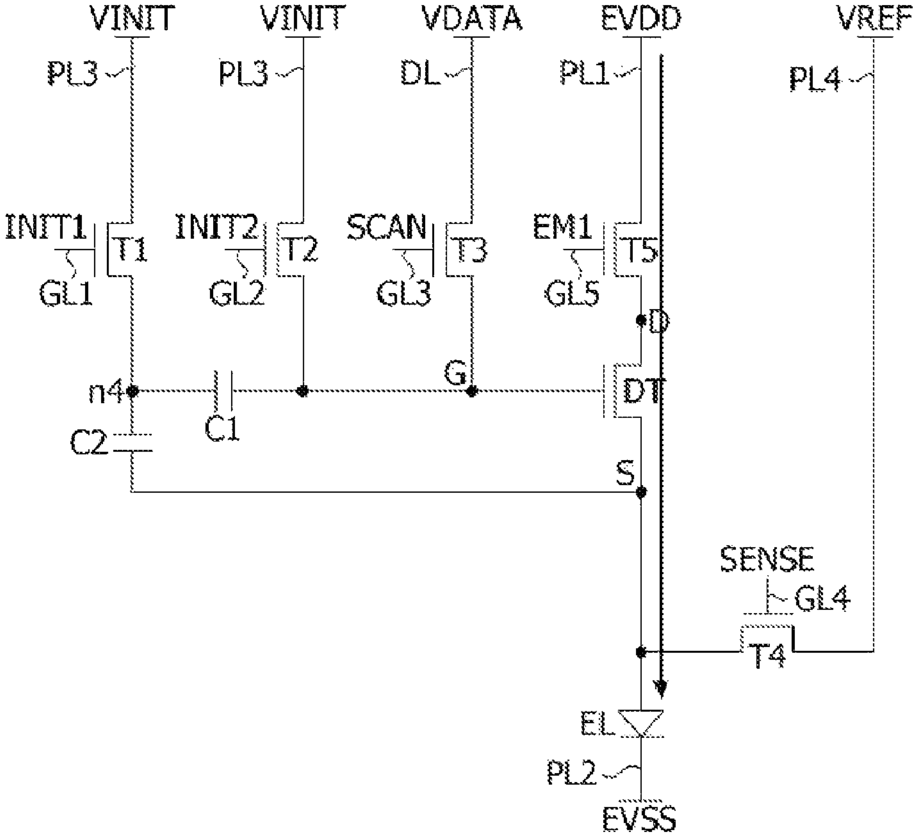

FIG. 9 is a circuit diagram illustrating a current flowing through the pixel circuit shown in FIG. 7 during a first period I1. FIG. 10 is a circuit diagram illustrating a current flowing through the pixel circuit shown in FIG. 7 during a second period I2. FIG. 11 is a circuit diagram illustrating a current flowing through the pixel circuit shown in FIG. 7 during a third period I3. FIG. 12 is a circuit diagram illustrating a current flowing through the pixel circuit shown in FIG. 7 during a fifth period I5.

Referring to FIG. 9, during the first period I1, the main nodes of the pixel circuit are initialized. During the first period I1, the voltage of the first gate signal INIT1, the second gate signal INIT2, and the fourth gate signal SENSE is the gate-on voltage VGH. During the first period I1, the voltage of the third gate signal SCAN and the fifth gate signal EM1 is the gate-off voltage VGL. Therefore, during the first period I1, the first, second, and fourth switch elements T1, T2, and T4 are turned on, and the third and fifth switch elements T3 and T5 are turned off. As a result, during the first period I1, the voltage of the second node G is initialized to the initialization voltage VINIT and the voltage of the third node S is initialized to the reference voltage VREF. At the end of the first period I1, the gate-source voltage Vgs of the driving element DT and the voltage of the second capacitor C2 are VINIT−VREF. During the first period I1, the driving element DT may be turned on. The light emitting element EL does not emit light during the first period I1. During the first period I1, the voltage of the first capacitor C1 is 0 [V].

Referring to FIG. 10, during the second period I2, the threshold voltage Vth of the driving element DT is sensed and stored in the second capacitor C2. During the second period I2, the voltage of the first gate signal INIT1, the second gate signal INIT2, and the fifth gate signal EM1 is the gate-on voltage VGH. During the second period I2, the voltage of the third gate signal SCAN and the fourth gate signal SENSE is the gate-off voltage VGL. Thus, during the second period I2, the first, second, and fifth switch elements T1, T2, and T5 are turned on, and the third and fourth switch elements T3 and T4 are turned off. During the second period I2, the driving element DT is turned off when the voltage of the second capacitor C2, in which the gate-source voltage Vgs of the driving element DT is stored, reaches the threshold voltage Vth of the driving element DT.

At the end of the second period I2, the voltage of the second node G is the initialization voltage VINIT, and the voltage of the third node S is VINIT−Vth. During the second period I2, the light emitting element EL does not emit light. During the second period I2, the voltage of the first capacitor C1 is 0 [V].

Referring to FIG. 11, during the third period I3, the data voltage VDATA of the pixel data is stored in the first capacitor C1. During the third period I3, the voltage of the first gate signal INIT1, the third gate signal SCAN, and the fifth gate signal EM1 is the gate-on voltage VGH. During the third period I3, the voltage of the second gate signal INIT2 and the fourth gate signal SENSE is the gate-off voltage VGL. During the third period I3 first, third, and fifth switch elements T1, T3, and T5 are turned on, and the second and fourth switch elements T2 and T4 are turned off. During the third period I3, the data voltage VDATA is applied to the second node G and the initialization voltage VINIT is applied to the fourth node n4. Therefore, at the end of the third period I3, the voltage of the first capacitor C1 is VDATA−VINIT. During the third period I3, the voltage of the third node S is VINIT−Vth, and the voltage of the second capacitor C2 is the threshold voltage Vth of the driving element DT. At the end of the third period I3, the gate-source voltage Vgs of the driving element DT is VDATA−VINIT+Vth.

During the fourth period I4, the voltage of the fourth gate signal SENSE is the gate-on voltage VGH, and the voltage of the first gate signal INIT1, the second gate signal INIT2, the third gate signal SCAN, and the fifth gate signal EM1 is the gate-off voltage VGL. During the fourth period I4, the fourth switch element T4 is turned on, and the first, second, third, and fifth switch elements T1, T2, T3, and T5 are turned off.

Referring to FIG. 12, during the fifth period I5, the driving element DT generates a current according to the gate-source voltage Vgs. The light emitting element EL may be emitted at a luminance corresponding to a gray scale value of the pixel data by the current flowing through the driving element DT.

During the fifth period I5, the voltage of the fifth gate signal EM1 is the gate-on voltage VGH, and the voltage of the other gate signals INIT1, INIT2, SCAN, and SENSE is the gate-off voltage VGL. During the fifth period I5, the fifth switch element T5 are turned on, and the first to fourth switch elements T1 to T4 are turned off. During the fifth period I5, the voltage of the second node G is VDATA+Voled, and the voltage of the third node S is VINIT−Vth+Voled. Therefore, during the fifth period I5, the gate-source voltage Vgs of the driving element DT is VDATA−VINIT+Vth. During the fifth period I5, the voltage of the first capacitor C1 is VDATA−VINIT, and the voltage of the second capacitor C2 is the threshold voltage Vth of the driving element DT.

Figure 13:
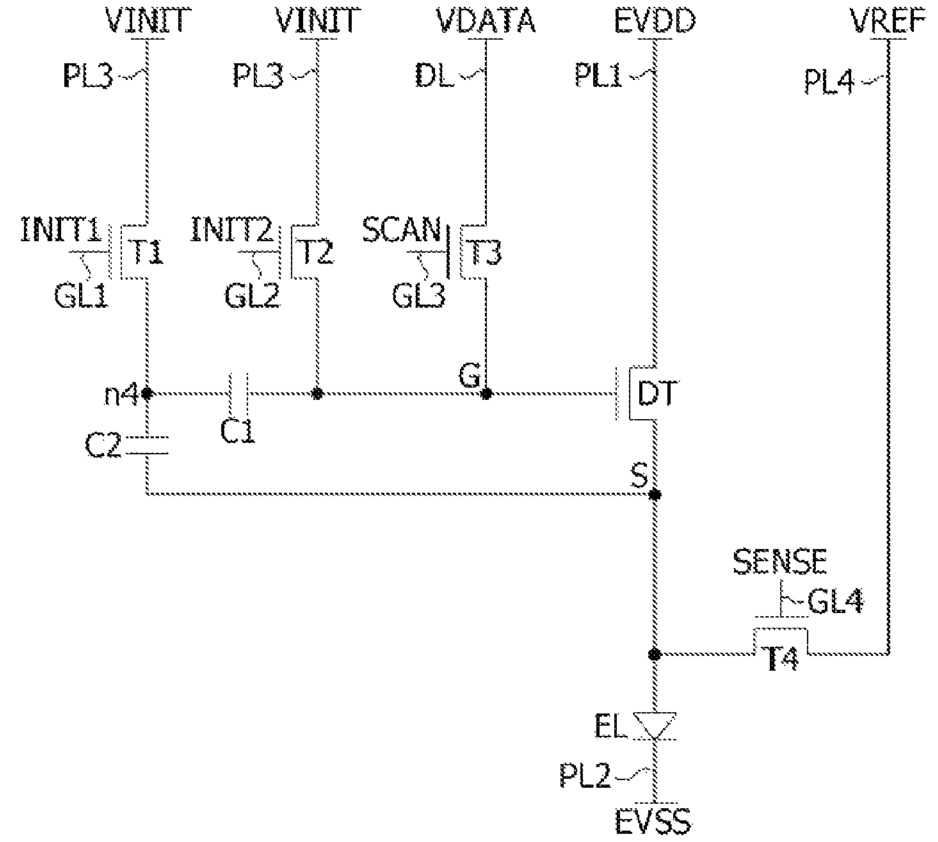
FIG. 13 is a circuit diagram illustrating a pixel circuit according to a third embodiment of the present disclosure.
Figure 14:
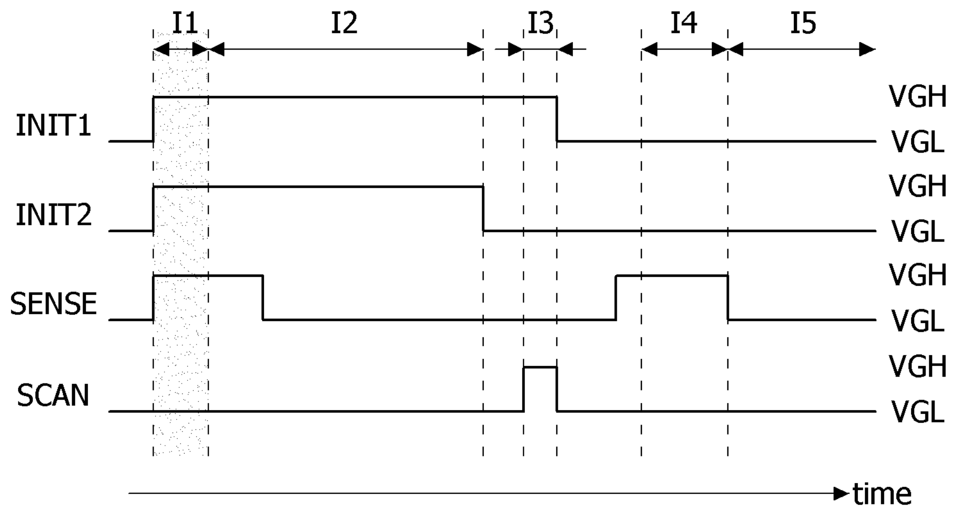
FIG. 14 is a waveform diagram illustrating waveforms of gate signals applied to the pixel circuit shown in FIG. 13.

FIG. 13 is a circuit diagram illustrating a pixel circuit according to a third embodiment of the present disclosure. FIG. 14 is a waveform diagram illustrating waveforms of gate signals applied to the pixel circuit shown in FIG. 13. In the third embodiment, substantially the same components as in the first and second embodiments described above and detailed descriptions thereof are omitted. In the third embodiment, the pixel circuit is operated without the fifth and sixth switch elements T5 and T6.

Referring to FIGS. 13 and 14, the pixel circuit includes a light emitting element EL, a driving element DT driving the light emitting element EL, a plurality of switch elements T1 to T4, a first capacitor C1, and a second capacitor C2. The driving element DT and the switch elements T1 to T4 may be implemented as n-channel oxide TFTs.

The gate signals INIT1, INIT2, SCAN, and SENSE include a first gate signal INIT1, a second gate signal INIT2, a third gate signal SCAN, and a fourth gate signal SENSE. The waveforms of the gate signals INIT1, INIT2, SCAN, and SENSE are substantially the same as in the first embodiment described above. A first to fourth switch elements T1 to T4 and the first capacitor C1 are substantially the same as in the second embodiment described above.

The driving element DT includes a first electrode connected to a first constant voltage node PL1 to which a pixel driving voltage is applied, a gate electrode connected to a second node G, and a second electrode connected to a third node S. An anode electrode of the light emitting element EL is connected to the third node S, and a cathode electrode thereof is connected to a second constant voltage node PL2 to which a cathode voltage EVSS is applied.

The first capacitor C1 is connected between the second node G and a fourth node n4. The second capacitor C2 is connected between the third node S and the fourth node n4.

Figure 15:
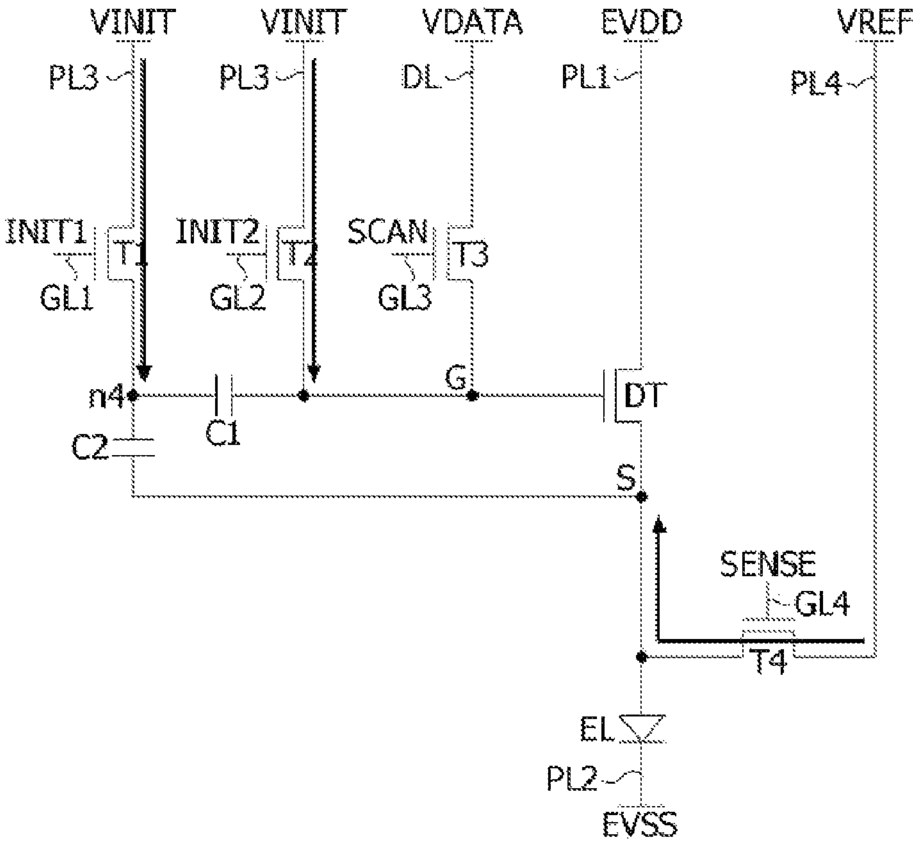
FIGS. 15 to 18 are diagrams illustrating operations of the pixel circuit shown in FIG. 13 in stages.
Figure 16:
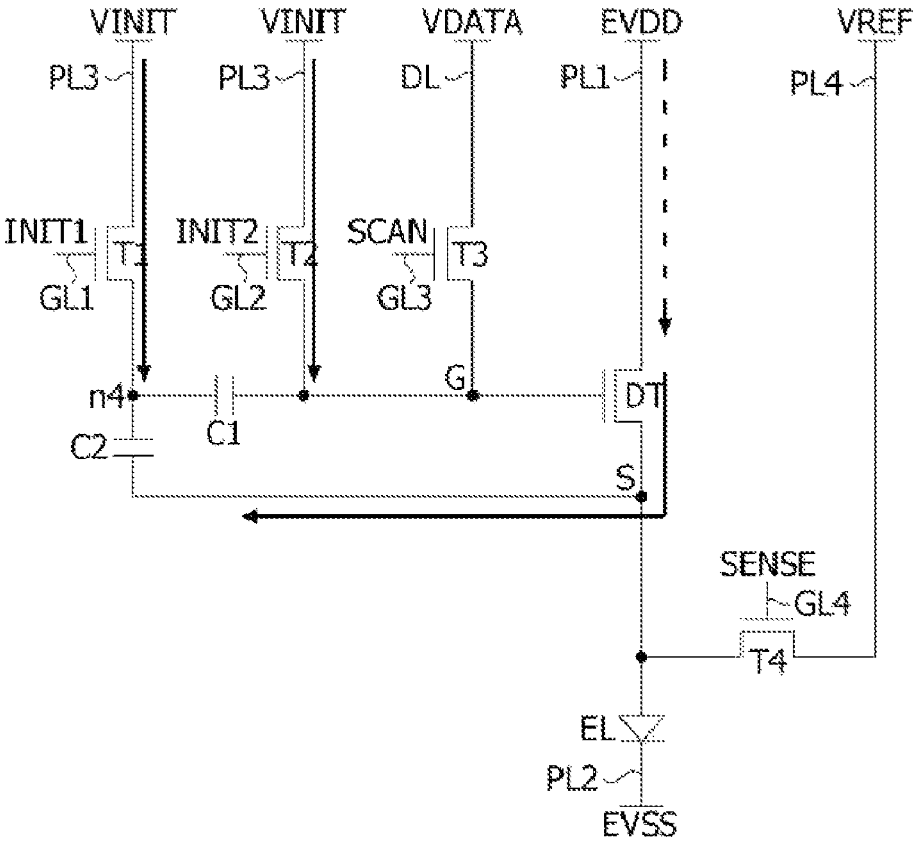
Figure 17:
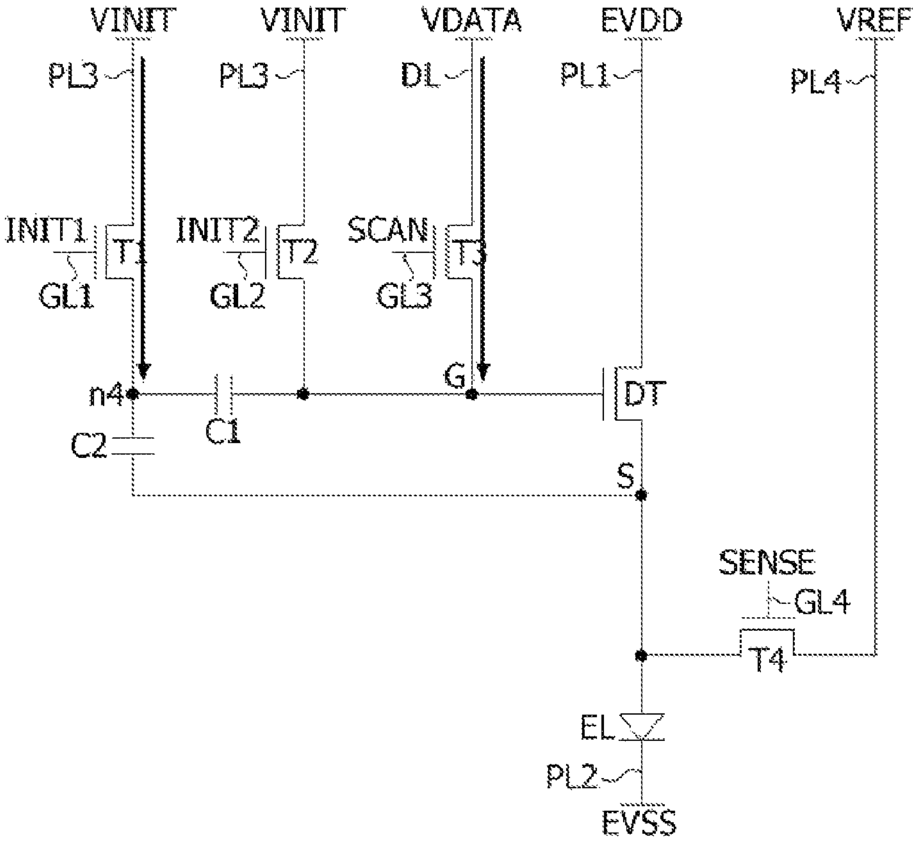
Figure 18:
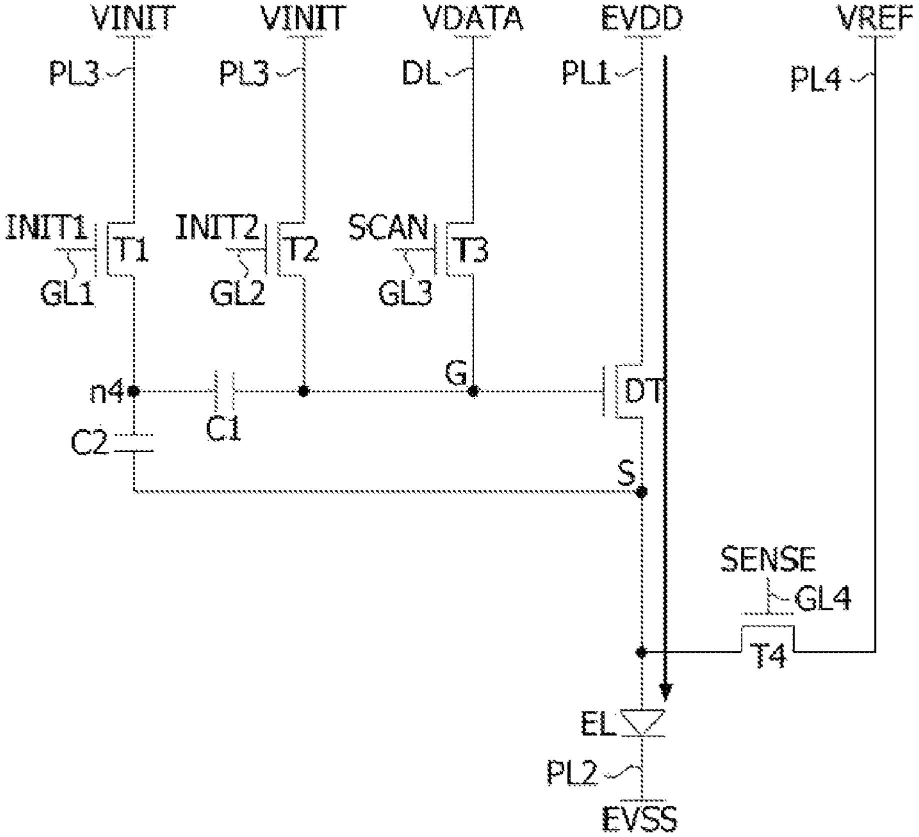

FIG. 15 is a circuit diagram illustrating a current flowing through the pixel circuit shown in FIG. 13 during a first period I1. FIG. 16 is a circuit diagram illustrating a current flowing through the pixel circuit shown in FIG. 13 during a second period I2. FIG. 17 is a circuit diagram illustrating a current flowing through the pixel circuit shown in FIG. 13 during a third period I3. FIG. 18 is a circuit diagram illustrating a current flowing through the pixel circuit shown in FIG. 7 during the fifth period I5.

Referring to FIG. 15, during the first period I1, the main nodes of the pixel circuit are initialized. During the first period I1, the voltage of the first gate signal INIT1, the second gate signal INIT2, and the fourth gate signal SENSE is the gate-on voltage VGH. During the first period I1, the voltage of the third gate signal SCAN is the gate off voltage VGL. Therefore, during the first period I1, the first, second, and fourth switch elements T1, T2, and T4 are turned on, and the third switch element T3 is turned off. As a result, during the first period I1, the voltage of the second node G is initialized to the initialization voltage VINIT and the voltage of the third node S is initialized to the reference voltage VREF. At the end of the first period I1, the gate-source voltage Vgs of the driving element DT and the voltage of the second capacitor C2 are VINIT−VREF. During the first period I1, the driving element DT may be turned on. The light emitting element EL does not emit light during the first period I1. During the first period I1, the voltage of the first capacitor C1 is 0 [V].

Referring to FIG. 16, during the second period I2, the threshold voltage Vth of the driving element DT is sensed and stored in the second capacitor C2. During the second period I2, the voltage of the first gate signal INIT1 and the second gate signal INIT2 is the gate-on voltage VGH. During the second period I2, the voltage of the third gate signal SCAN and the fourth gate signal SENSE is the gate-off voltage VGL. Therefore, during the second period I2, the first and second switch elements T1 and T2 are turned on, and the third and fourth switch elements T3 and T4 are turned off. During the second period I2, the driving element DT is turned off when the voltage of the second capacitor C2, in which the gate-source voltage Vgs of the driving element DT is stored, reaches the threshold voltage Vth of the driving element DT.

At the end of the second period I2, the voltage of the second node G is the initialization voltage VINIT, and the voltage of the third node S is VINIT−Vth. During the second period I2, the light emitting element EL does not emit light. During the second period I2, the voltage of the first capacitor C1 is 0 [V].

Referring to FIG. 17, during the third period I3, the data voltage VDATA of the pixel data is stored in the first capacitor C1. During the third period I3, the voltage of the first gate signal INIT1 and the third gate signal SCAN is the gate-on voltage VGH. During the third period I3, the voltage of the second gate signal INIT2 and the fourth gate signal SENSE is the gate-off voltage VGL. During the third period I3, the first and third switch elements T1 and T3 are turned on, and the second and fourth switch elements T2 and T4 are turned off. During the third period I3, the data voltage VDATA is applied to the second node G and the initialization voltage VINIT is applied to the fourth node n4. Therefore, at the end of the third period I3, the voltage of the first capacitor C1 is VDATA−VINIT. During the third period I3, the voltage of the third node S is VINIT−Vth, and the voltage of the second capacitor C2 is the threshold voltage Vth of the driving element DT. At the end of the third period I3, the gate-source voltage Vgs of the driving element DT is VDATA−VINIT+Vth.

During the fourth period I4, the voltage of the fourth gate signal SENSE is the gate-on voltage VGH and the voltage of the first to third gate signals INIT1, INIT2, and SCAN is the gate-off voltage VGL. During the fourth period I4, the fourth switch element T4 is turned on, and the first to third switch elements T1, T2, and T3 are turned off.

Referring to FIG. 18, during the fifth period I5, the driving element DT generates a current according to the gate-source voltage Vgs. The light emitting element EL may be emitted at a luminance corresponding to a gray scale value of the pixel data by the current flowing through the driving element DT.

During the fifth period I5, the voltage of the second node G is VDATA+Voled, and the voltage of the third node S is VINIT−Vth+Voled. Therefore, during the fifth period I5, the gate-source voltage Vgs of the driving element DT is VDATA−VINIT+Vth. During the fifth period I5, the voltage of the first capacitor C1 is VDATA−VINIT, and the voltage of the second capacitor C2 is the threshold voltage Vth of the driving element DT.

Figure 19:
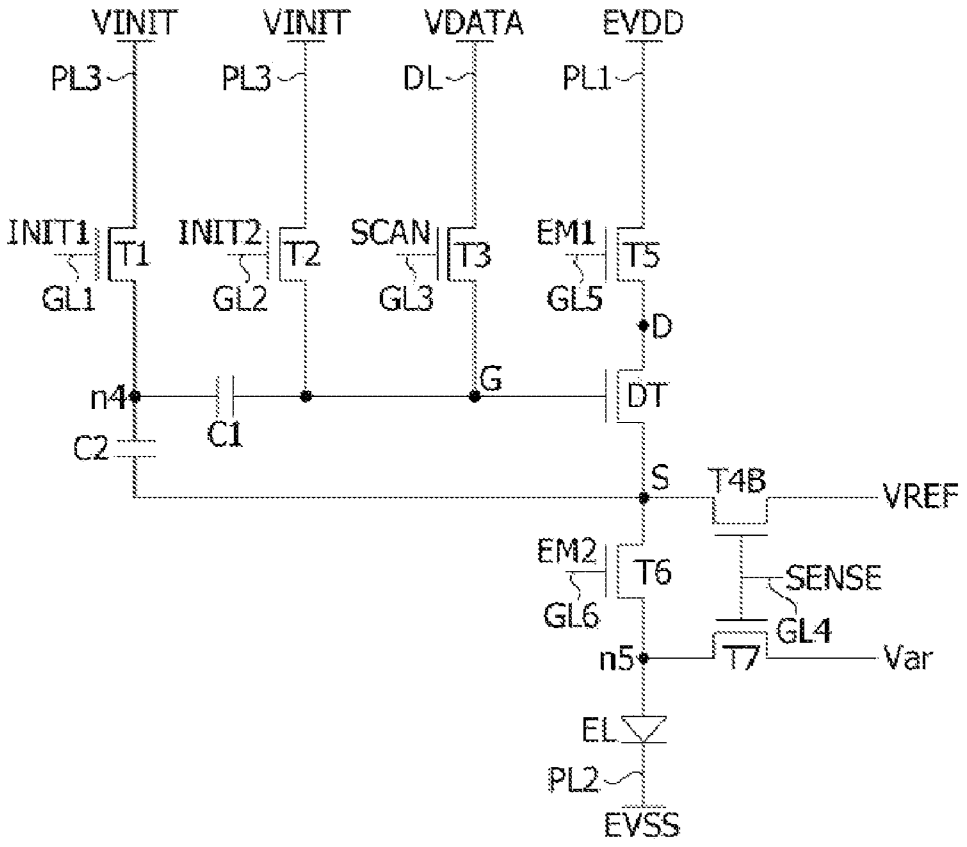
FIG. 19 is a circuit diagram illustrating a pixel circuit according to a fourth embodiment of the present disclosure.
Figure 20:
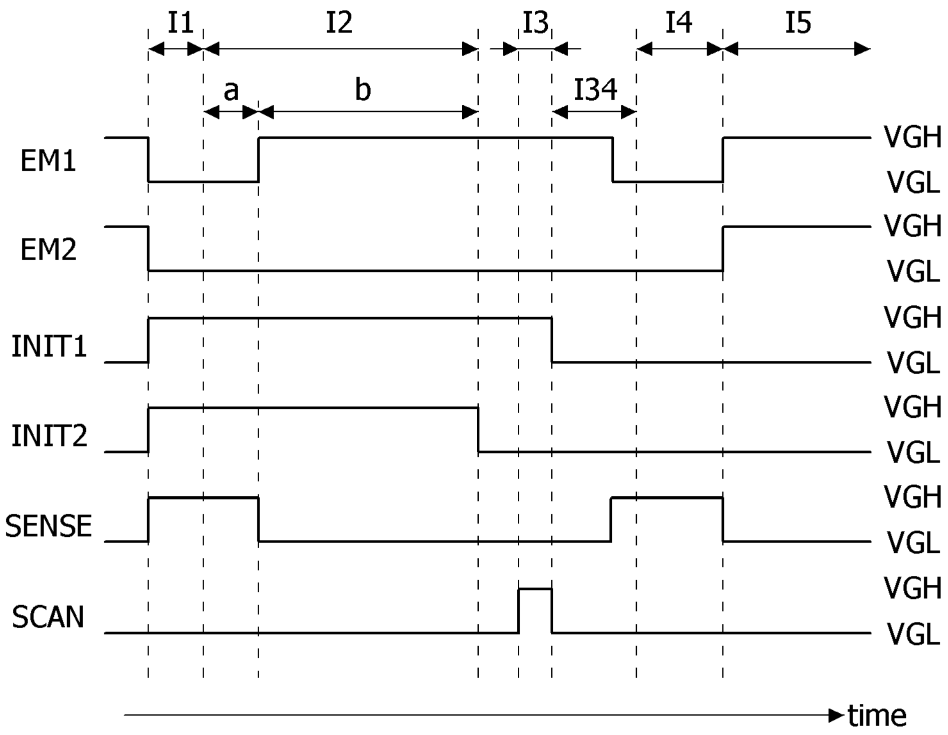
FIG. 20 is a waveform diagram illustrating waveforms of gate signals applied to the pixel circuit shown in FIG. 19.

FIG. 19 is a circuit diagram illustrating a pixel circuit according to a fourth embodiment of the present disclosure. FIG. 20 is a waveform diagram illustrating waveforms of gate signals applied to the pixel circuit shown in FIG. 19. In the fourth embodiment, substantially the same components as in the first embodiment described above and detailed descriptions thereof are omitted.

Referring to FIGS. 19 and 20, the pixel circuit includes a light emitting element EL, a driving element DT that drives the light emitting element EL, a plurality of switch elements T1 to T7, a first capacitor C1, and a second capacitor C2. The driving element DT and the switch elements T1 to T7 may be implemented as n-channel oxide TFTs.

In this embodiment, it is possible to improve an anode reset effect in a low-speed driving mode and to set a cathode voltage EVSS to be set to 0 [V] by adding a seventh switch element T7 which switches a separate anode reset voltage Var to the pixel circuit, thereby reducing the power consumption. The anode reset voltage Var may be set to a constant voltage that is about 0.5 to 1 [V] higher than the cathode voltage EVSS. For example, the cathode voltage EVSS may be 0 [V] and the anode reset voltage Var may be 0.5 [V].

A driving period of the pixel circuit is determined by the waveforms of the gate signals INIT1, INIT2, SCAN, SENSE, EM1, and EM2 and may be divided into first to fifth periods I1 to I5, which are adjustable.

The first to fifth gate signals INIT1, INIT2, SCAN, SENSE, and EM may be set substantially the same as in the foregoing embodiments. The voltage of the sixth gate signal EM2 may be the gate-on voltage VGH during the fifth period I5 and the gate-off voltage VGL during the first to fourth periods I1 to I4.

A fourth switch element T4B is turned on in response to a pulse of the fourth gate signal SENSE during first and fourth periods I1 and I4. The fourth switch element T4B is turned off during a second period I2, a third period I3, and a fifth period I5. The fourth switch element T4B includes a first electrode connected to a third node S, a gate electrode to which the fourth gate signal SENSE is applied, and a second electrode to which a reference voltage VREF is applied.

A seventh switch element T7 is turned on in response to a pulse of the fourth gate signal SENSE during the first and fourth periods I1 and I4. The seventh switch element T7 is turned off during the second period I2, the third period I3, and the fifth period I5. The seventh switch element T7 includes a first electrode connected to a fifth node n5, a gate electrode to which the fourth gate signal SENSE is applied, and a second electrode to which an anode reset voltage Var is applied. A fifth node n5 is connected to an anode electrode of the light emitting element EL.

Figure 21:
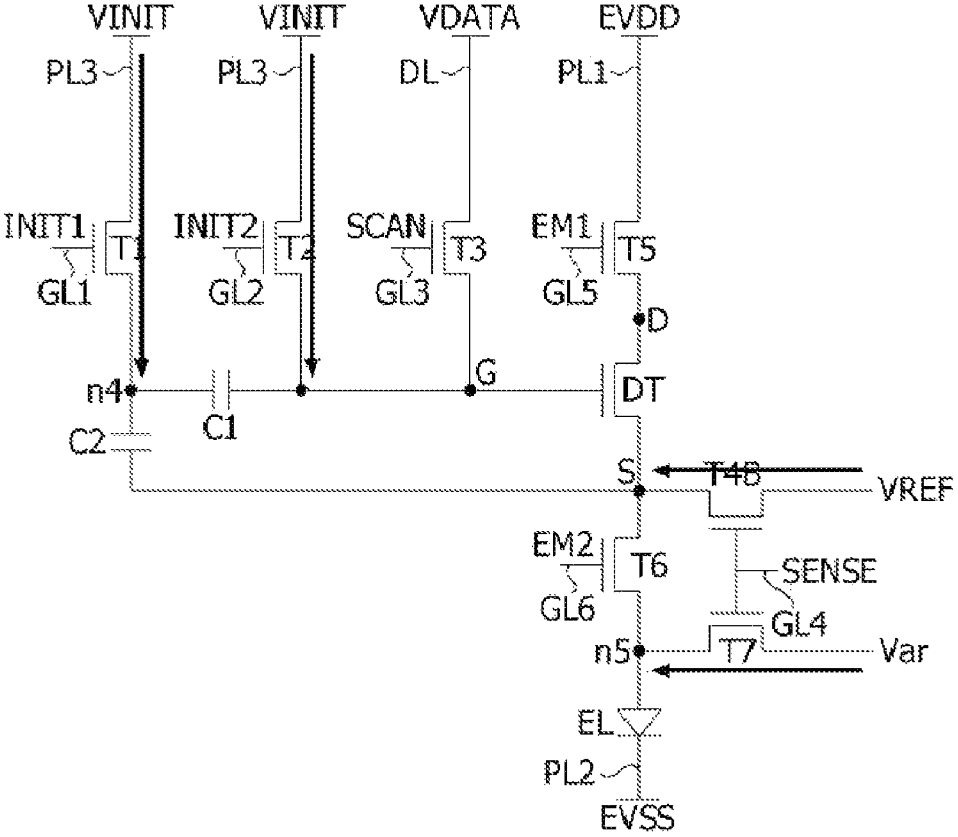
FIGS. 21 to 24 are diagrams illustrating operations of the pixel circuit shown in FIG. 19 in stages.
Figure 22:
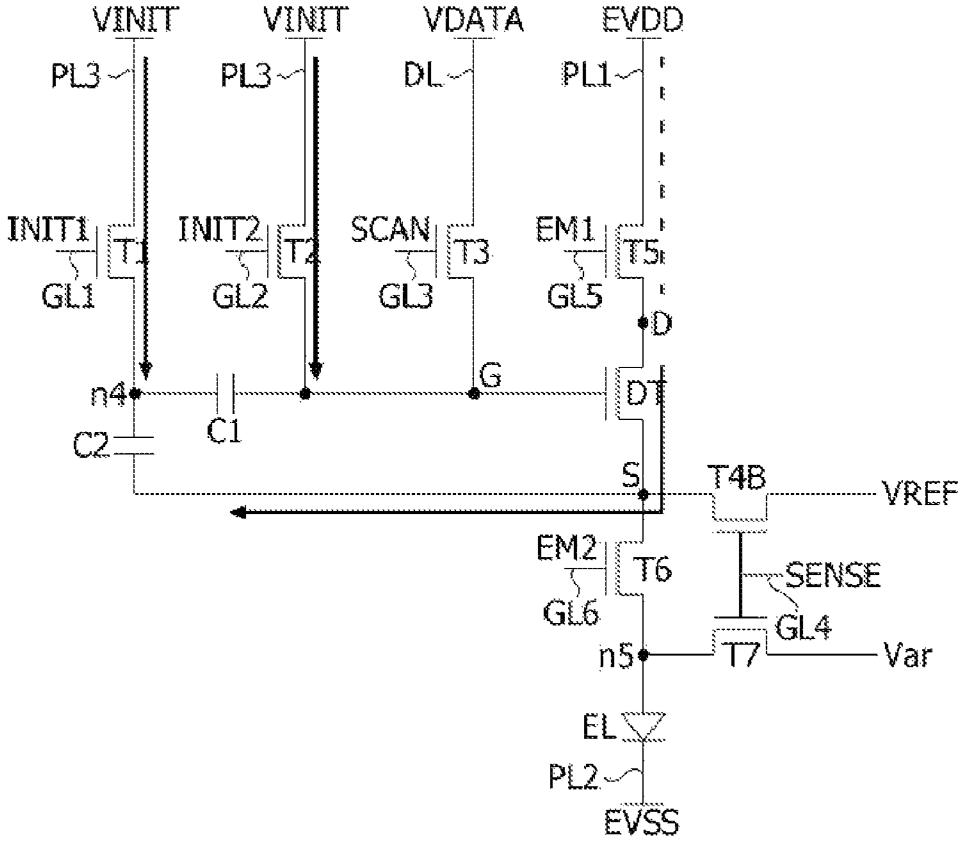
Figure 23:
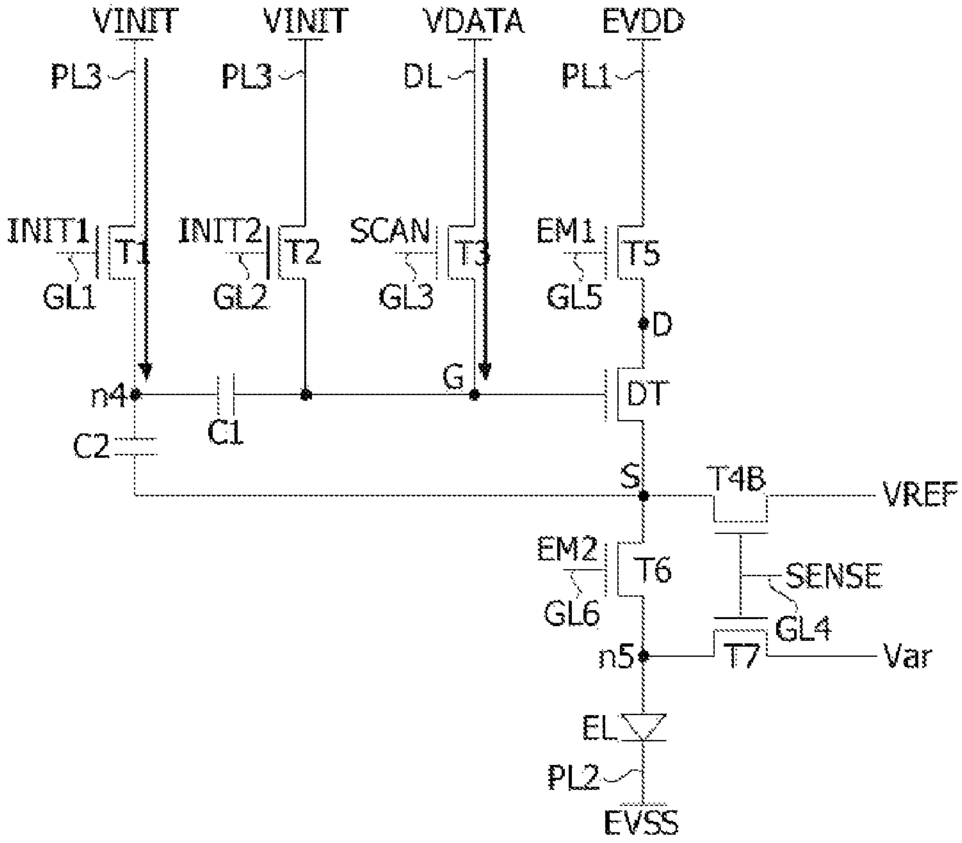
Figure 24:
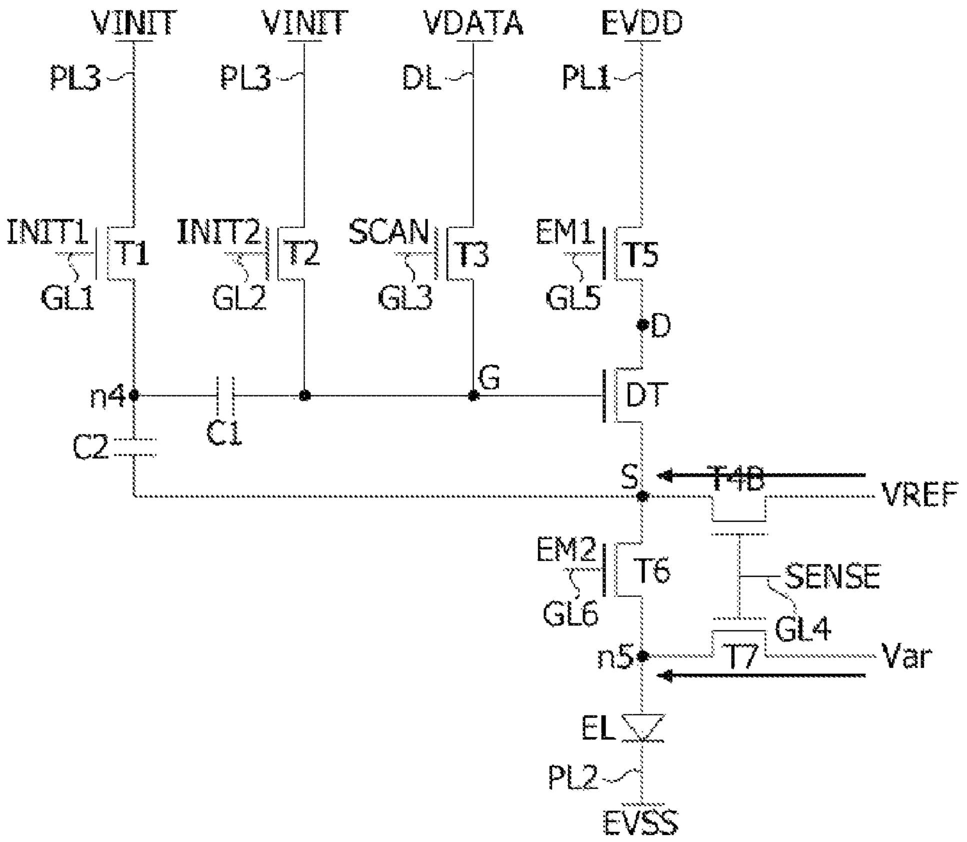

FIG. 21 is a circuit diagram illustrating a current flowing through the pixel circuit shown in FIG. 19 during a first period I1. FIG. 22 is a circuit diagram illustrating a current flowing through the pixel circuit shown in FIG. 19 during a second period I2. FIG. 23 is a circuit diagram illustrating a current flowing through the pixel circuit shown in FIG. 19 during a third period I3. FIG. 24 is a circuit diagram illustrating a current flowing through the pixel circuit shown in FIG. 19 during a fourth period I4.

Referring to FIG. 21, during the first period I1, the main nodes of the pixel circuit are initialized. During the first period I1, the voltage of the first gate signal INIT1, the second gate signal INIT2, and the fourth gate signal SENSE is the gate-on voltage VGH. During the first period I1, the voltage of the third gate signal SCAN, the fifth gate signal EM1, and the sixth gate signal EM1 is the gate-off voltage VGL. Therefore, during the first period I1, the first, second, fourth, and seventh switch elements T1, T2, T4B, and T7 are turned on, and the third, fifth, and sixth switch elements T3, T5, and T6 are turned off. As a result, during the first period I1, the voltage of the second node G is initialized to the initialization voltage VINIT and the voltage of the third node S is initialized to the reference voltage VREF. At the end of the first period I1, the gate-source voltage Vgs of the driving element DT and the voltage of the second capacitor C2 are VINIT−VREF. At the end of the first period I1, an anode voltage of the light emitting element EL is an anode reset voltage Var. During the first period I1, the driving element DT may be turned on. The light emitting element EL does not emit light during the first period I1. During the first period I1, the voltage of the first capacitor C1 is 0 [V].

Referring to FIG. 22, during the second period I2, a threshold voltage Vth of the driving element DT is sensed and stored in the second capacitor C2. During the second period I2, the voltage of the first gate signal INIT1, the second gate signal INIT2, and the fifth gate signal EM1 is the gate-on voltage VGH. During the second period I2, the voltage of the third gate signal SCAN and the fourth gate signal SENSE and the sixth gate signal EM2 is the gate-off voltage VGL. Therefore, during the second period I2, the first, second, and fifth switch elements T1, T2, and T5 are turned on, and the third, fourth, sixth, and seventh switch elements T3, T4B. T6 and T7 are turned off. During the second period I2, the driving element DT is turned off when the voltage of the second capacitor C2, in which the gate-source voltage Vgs of the driving element DT is stored, reaches the threshold voltage Vth of the driving element DT.

At the end of the second period I2, the voltage of the second node G is the initialization voltage VINIT, and the voltage of the third node S is VINIT−Vth. During the second period I2, the light emitting element EL does not emit light. During the second period I2, the voltage of the first capacitor C1 is 0 [V], and the anode voltage of the light emitting element EL is the anode reset voltage Var.

Referring to FIG. 23, during the third period I3, the data voltage VDATA of the pixel data is stored in the first capacitor C1. During the third period I3, the voltage of the first gate signal INIT1, the third gate signal SCAN, and the fifth gate signal EM1 is the gate-on voltage VGH. During the third period I3, the voltage of the second gate signal INIT2, the fourth gate signal SENSE, and the sixth gate signal EM1 is the gate-off voltage VGL. During the third period I3, the first, third, and fifth switch elements T1, T3, and T5 are turned on, and the second, fourth, sixth, and seventh switch elements T2, T4B, T6, and T7 are turned off. During the third period I3, the data voltage VDATA is applied to the second node G and the initialization voltage VINIT is applied to the fourth node n4. Therefore, at the end of the third period I3, the voltage of the first capacitor C1 is VDATA−VINIT. During the third period I3, the voltage of the third node S is VINIT−Vth, and the voltage of the second capacitor C2 is the threshold voltage Vth of the driving element DT. During the third period I3, the anode voltage of the light emitting element EL is the anode reset voltage Var. At the end of the third period I3, the gate-source voltage Vgs of the driving element DT is VDATA−VINIT+Vth.

Referring to FIG. 24, during the fourth period I4, the voltage of the fourth gate signal SENSE is the gate-on voltage VGH and the voltage of the other gate signals INIT1, INIT2, SCAN, EM1, and EM2 is the gate-off voltage VGL. During the fourth period I4, the fourth and seventh switch elements T4B and T7 are turned on, and the first, second, third, fifth, and sixth switch elements T1, T2, T3, T5, and T6 are turned off. During the fourth period I4, the voltage of the first capacitor C1 is VDATA−VINIT, and the voltage of the second capacitor C2 is the threshold voltage Vth of the driving element DT. During the fourth period I4, the voltage of the second node G is the data voltage VDATA and the voltage of the third node S is VINIT−Vth. During the fourth period I4, the anode voltage of the light emitting element EL is the anode reset voltage Var. During the fourth period I4, the gate-source voltage Vgs of the driving element DT is VDATA−VINIT+Vth.

During the fifth period I5, the light emitting element EL is driven by a current from the driving element DT as shown in FIG. 6A in the pixel circuit shown in FIG. 19.

Figure 25:
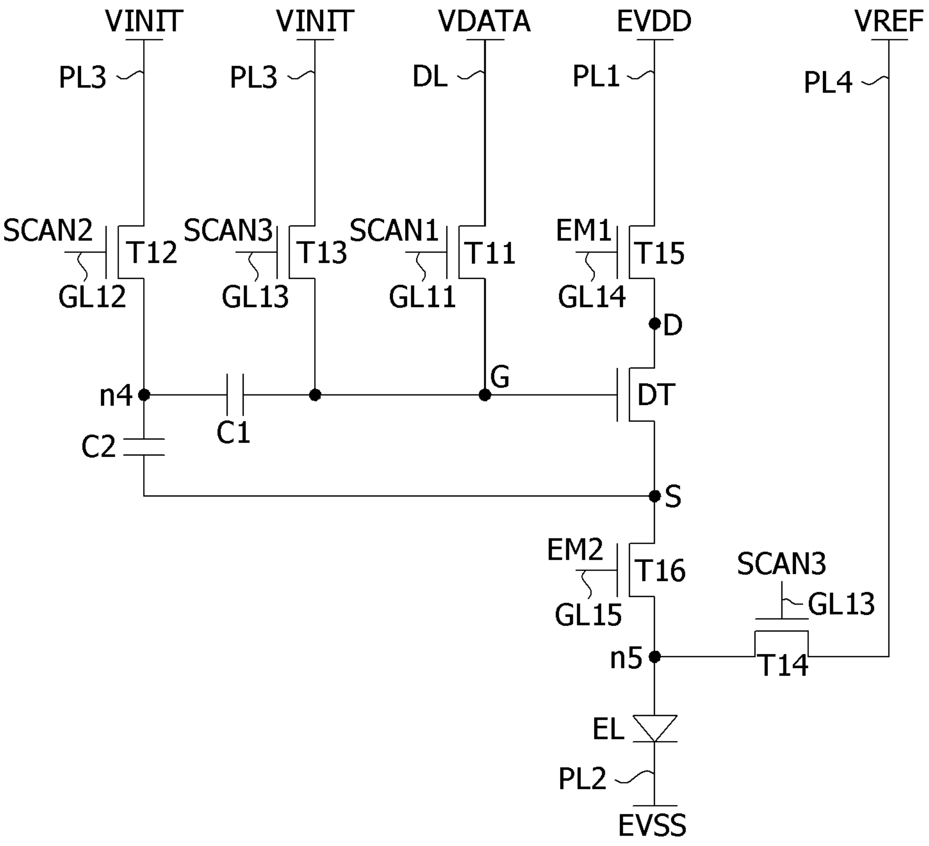
FIG. 25 is a circuit diagram illustrating a pixel circuit according to a fifth embodiment of the present invention.
Figure 26:
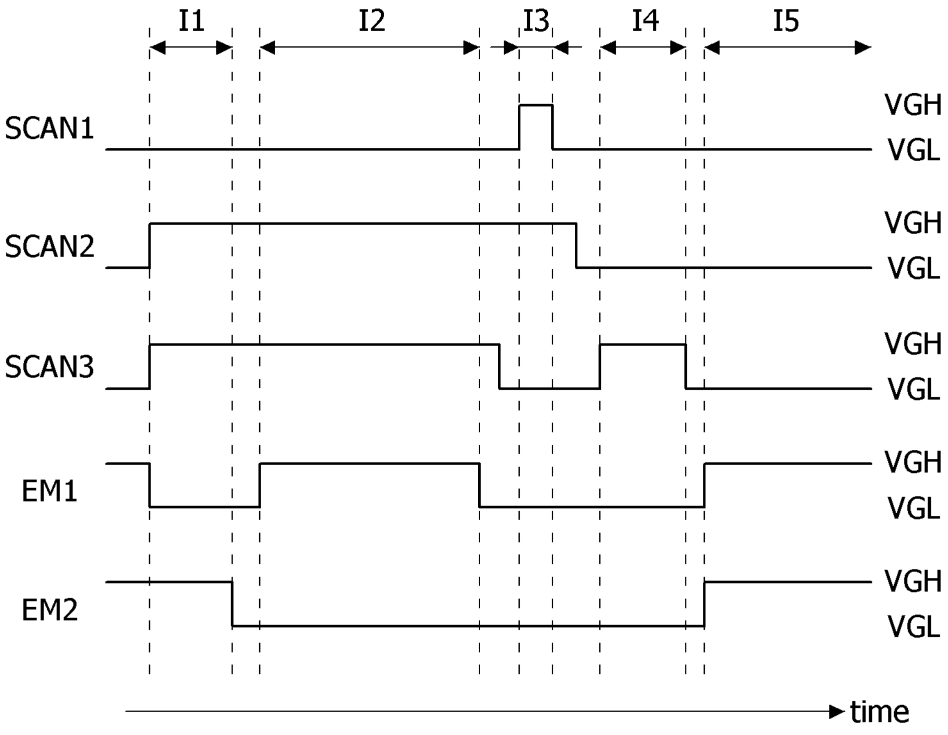
FIG. 26 is a waveform diagram illustrating waveforms of gate signals applied to the pixel circuit shown in FIG. 15.

FIG. 25 is a circuit diagram illustrating a pixel circuit according to a fifth embodiment of the present invention. FIG. 26 is a waveform diagram illustrating waveforms of gate signals applied to the pixel circuit shown in FIG. 15.

Referring to FIGS. 25 and 26, the pixel circuit includes a light emitting element EL, a driving element DT driving the light emitting element EL, a plurality of switch elements T11 to T16, a first capacitor C1, and a second capacitor C2. The driving element DT and the switch elements T11 to T16 may be implemented as n-channel oxide TFTs.

The pixel circuit is connected to a data line DL to which a data voltage VDATA is applied, and to gate lines GL1 through GL6 to which gate signals SCAN1, SCAN2, SCAN3, EM1, and EM2 are applied. The pixel circuit is connected to a first constant voltage node PL1 to which a pixel driving voltage EVDD is applied, a second constant voltage node PL2 to which a cathode voltage EVSS is applied, a third constant voltage node PL3 to which an initialization voltage VINIT is applied, and a fourth constant voltage node PL4 to which a reference voltage VREF is applied. On the display panel, the power lines to which the constant voltage nodes are connected may be commonly connected to all of pixels.

The gate signals SCAN1, SCAN2, SCAN3, EM1, and EM2 include pulses that swing between the gate-on voltage VGH and the gate-off voltage VGL. The gate signals SCAN1, SCAN2, SCAN3, EM1, and EM2 include a first gate signal SCAN1, a second gate signal SCAN2, a third gate signal SCAN3, a fourth gate signal EM1, and a fifth gate signal EM2. A driving period of the pixel circuit may be determined by the waveforms of the gate signals SCAN1, SCAN2, SCAN3, EM1, and EM2.

The gate driver 120 may include a shift register for sequentially outputting the first gate signal SCAN1, a first edge trigger for sequentially outputting the second gate signal SCAN2, a second edge trigger for sequentially outputting the third gate signal SCAN3, a third edge trigger for sequentially outputting the fourth gate signal EM1, and a fourth edge trigger for sequentially outputting the fifth gate signal EM2.

A voltage of the first gate signal SCAN1 is generated as a pulse of the gate-on voltage VGH during a third period I3 and is the gate-off voltage VGL during a first period I1, a second period I2, a fourth period I4, and a fifth period I5. A voltage of the second gate signal SCAN2 is generated as a pulse of the gate-on voltage VGH during the first to third periods I1, I2, and I3, and is the gate-off voltage VGL during the fourth and fifth periods I4 and I5.

A voltage of the third gate signal SCAN3 is generated as a pulse of the gate-on voltage VGH during the first period I1, the second period I2, and the fourth period I4, and is the gate-off voltage VGL during the third and fifth periods I3 and I5. A voltage of the fourth gate signal EM1 is a gate-off voltage VGL during the first period I1, is generated as a pulse of the gate-on voltage VGH during the second period I2, and is then the gate-off voltage VGL during the third and fourth periods I3 and I4. The voltage of the fourth gate signal EM1 is the gate-on voltage VGH during the fifth period I5. A voltage of the fifth gate signal EM2 is the gate-on voltage VGH during the first period I1 and is generated as a pulse of the gate-off voltage VGL during the second to fourth periods I2, I3, and I4. The voltage of the fifth gate signal EM2 is the gate-on voltage VGH during the fifth period I5.

Between the second period I2 and the third period I3, after the voltage of the fourth gate signal EM1 is inverted to the gate-off voltage VGL, the voltage of the third gate signal SCAN3 may be inverted to the gate-off voltage VGL, and then the first scan signal SCAN1 may be inverted to the gate-on voltage VGH. Between the third period I3 and the fourth period I4, after the voltage of the first gate signal SCAN1 is inverted to the gate-off voltage VGL, the voltage of the second gate signal SCAN2 may be inverted to the gate-off voltage VGL, and then the voltage of the third gate signal SCAN3 may be inverted to the gate-on voltage VGH.

The driving element DT includes a first electrode connected to a first node D, a gate electrode connected to a second node G, and a second electrode connected to a third node S.

The light emitting element EL may be implemented as an OLED. The light emitting element EL includes an anode electrode, a cathode electrode, and an organic compound layer formed between the electrodes. The anode electrode of the light emitting element EL is connected to a fifth node n5, and the cathode electrode is connected to the second constant voltage node PL2 to which the cathode voltage EVSS is applied.

A threshold voltage Vth of the driving element DT is stored in the second capacitor C2, and then the data voltage VDATA of the pixel data is stored in the first capacitor C1. The first capacitor C1 is connected between the second node G and a fourth node n4 to store the data voltage VDATA during the third period I3. The second capacitor C2 is connected between the third node S and the fourth node n4 to store the threshold voltage Vth of the driving element DT sensed during the second period I2.

The switch elements T11 to T16 in the pixel circuit include a first switch element T11 that supplies the data voltage VDATA of pixel data to the second node G in response to the first gate signal SCAN1, a second switch element T12 that supplies the initialization voltage VINIT to the fourth node n4 in response to the second gate signal SCAN2, a third switch element T13 that supplies the initialization voltage VINIT to the second node G in response to the third gate signal SCAN3, a fourth switch element T14 that supplies the reference voltage VREF to the fifth node n5 in response to the third gate signal SCAN3, a fifth switch element T15 that supplies the pixel drive voltage EVDD to the first node D in response to the fourth gate signal EM1, and a sixth switch element T16 that connects the third node S to the fifth node n5 in response to the fifth gate signal EM2.

The first switch element T11 is turned on in response to a pulse of the first gate signal SCAN1 synchronized to the data voltage VDATA of pixel data during the third period I3. The first switch element T11 is turned off during the first period I1, the second period I2, the fourth period I4, and the fifth period I5. When the first switch element T11 is turned on, the data line DL is electrically connected to the second node G so that the data voltage VDATA is applied to the second node G. The first switch element T11 includes a first electrode connected to the data line DL to which the data voltage VDATA is applied, a gate electrode connected to a first gate line GL11 to which the first gate signal SCAN1 is applied, and a second electrode connected to the second node G.

The second switch element T12 is turned on in response to a pulse of the second gate signal SCAN2 generated as the gate-on voltage VGH during the first to third periods I1 to I3. When the second switch element T12 is turned on, the initialization voltage VINIT is applied to the fourth node n4. The second switch element T12 is turned off during the fourth and fifth periods I4 and I5. The second switch element T12 includes a first electrode connected to the third constant voltage node PL3 to which the initialization voltage VINIT is applied, a gate electrode connected to a second gate line GL12 to which the second gate signal SCAN2 is applied, and a second electrode connected to the fourth node n4.

The third switch element T13 is turned on in response to a pulse of the third gate signal SCAN3 generated as the gate-on voltage VGH during the first period I1, the second period I2, and the fourth period I4. When the third switch element T13 is turned on, the initialization voltage VINIT is applied to the second node G. The third switch element T13 is turned off during the third period I3 and the fifth period I5. The third switch element T13 includes a first electrode connected to the third constant voltage node PL3 to which the initialization voltage VINIT is applied, a gate electrode connected to a third gate line GL13 to which the third gate signal SCAN3 is applied, and a second electrode connected to the second node G.

The fourth switch element T14 is turned on in response to a pulse of the third gate signal SCAN3 generated as the gate-on voltage VGH during the first period I1, the second period I2, and the fourth period I4. When the fourth switch element T14 is turned on, the reference voltage VREF is applied to the fifth node n5. The fourth switch element T14 is turned off during the third period I3 and the fifth period I5. The fourth switch element T14 includes a first electrode connected to the fifth node n5, a gate electrode connected to the third gate line GL13 to which the third gate signal SCAN3 is applied, and a second electrode connected to the fourth constant voltage node PLA to which the reference voltage VREF is applied.

The fifth switch element T15 is turned on in response to a pulse of the fourth gate signal EM1 generated as the gate-on voltage VGH during the second period I2 and the fifth period I5 to supply the pixel drive voltage EVDD to the first node D. The fifth switch element T15 is turned off during the first period I1, the third period I3, and the fourth period I4. The fifth switch element T15 includes a first electrode connected to the first constant voltage node PL1 to which the pixel driving voltage EVDD is applied, a gate electrode connected to a fourth gate line GL14 to which the fourth gate signal EM1 is applied, and a second electrode connected to the first node D.

The sixth switch element T16 is turned on in response to the gate-on voltage VGH of the fifth gate signal EM2 during the first period I1 and the fifth period I5. When the sixth switch element T16 is turned on, the third node S is electrically connected to the fifth node n5, allowing current to flow from the driving element DT to the light emitting element EL. The sixth switch element T16 is turned off during the second period I2, the third period I3, and the fourth period I4. The sixth switch element T16 includes a first electrode connected to the third node S, a gate electrode connected to a fifth gate line GL15 to which the fifth gate signal EM2 is applied, and a second electrode connected to the fifth node n5.

Figure 27A:
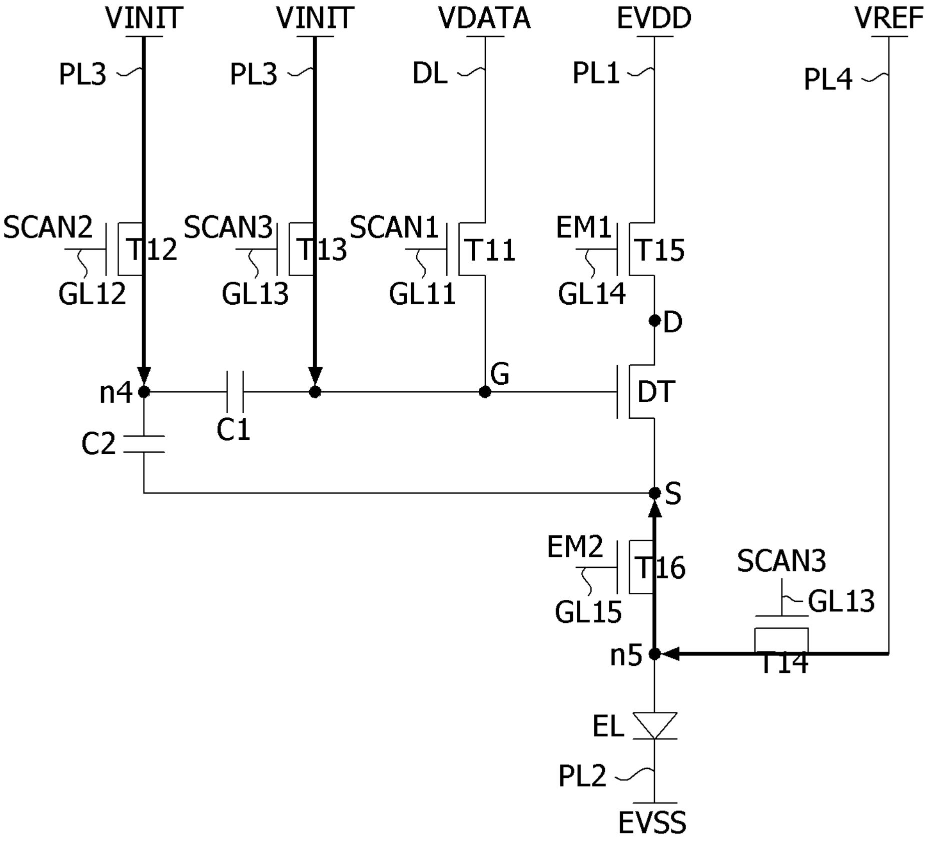
FIGS. 27A to 31B are circuit diagrams illustrating the operation of the pixel circuit shown in FIG. 25 in stages.

FIGS. 27A to 31B are diagrams illustrating, step by step, the operation periods of the pixel circuit shown in FIG. 25. FIG. 27A is a circuit diagram illustrating the current flowing in the pixel circuit shown in FIG. 25 I1 during a first period.

Figure 27B:
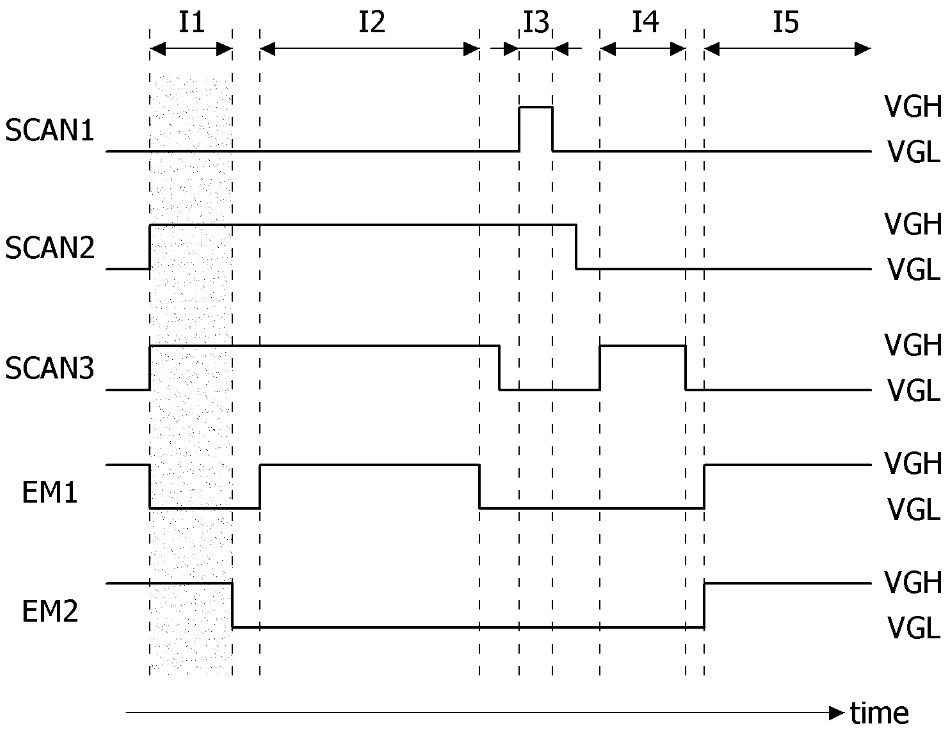

Referring to FIGS. 27A and 27B, the main nodes of the pixel circuit are initialized during the first period I1. During the first period I1, the voltage of the second gate signal SCAN2, the third gate signal SCAN3, and the fifth gate signal EM2 is the gate-on voltage VGH. During the first period I1, the voltage of the first gate signal SCAN1 and the fourth gate signal EM1 is the gate-off voltage VGL. Therefore, during the first period I1, the second, third, fourth, and sixth switch elements T12, T13, T14, and T16 are turned on, and the first and fifth switch elements T11 and T15 are turned off. As a result, during the first period I1, the voltage of the second node G is initialized to the initialization voltage VINIT and the voltage of the third node S is initialized to the reference voltage VREF. During the first period I1, the voltage of the first capacitor C1 is 0 [V].

Figure 28A:
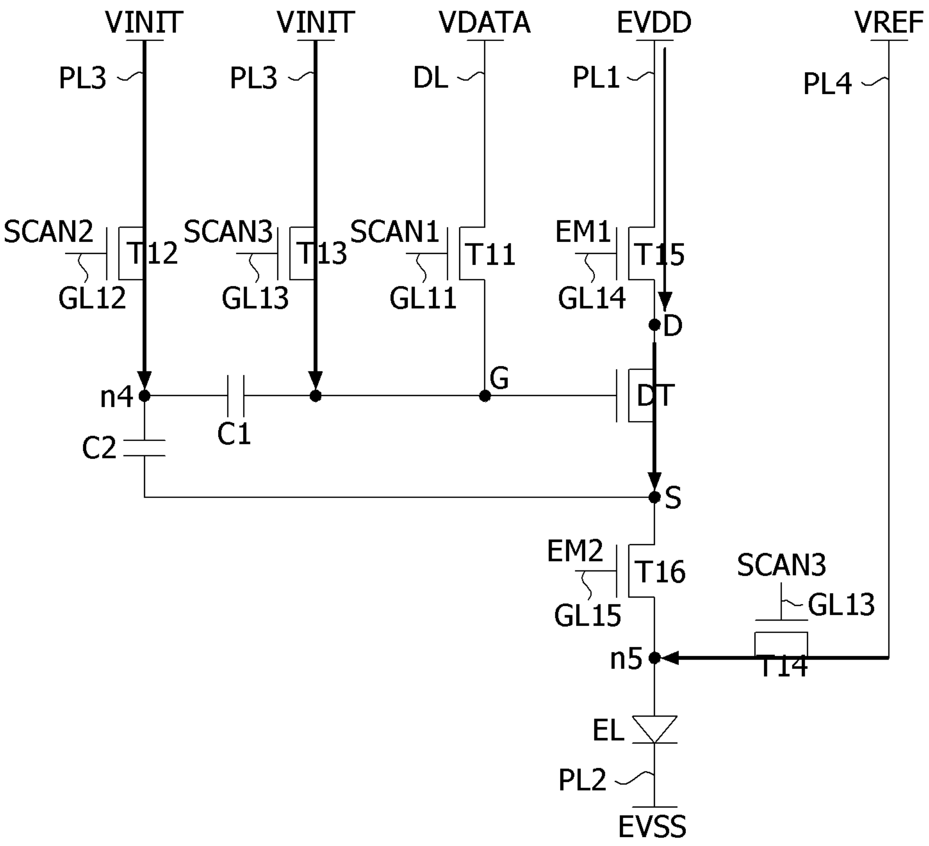

FIG. 28A is a circuit diagram illustrating the current flowing in the pixel circuit shown in FIG. 25 during the second period I2.

Figure 28B:
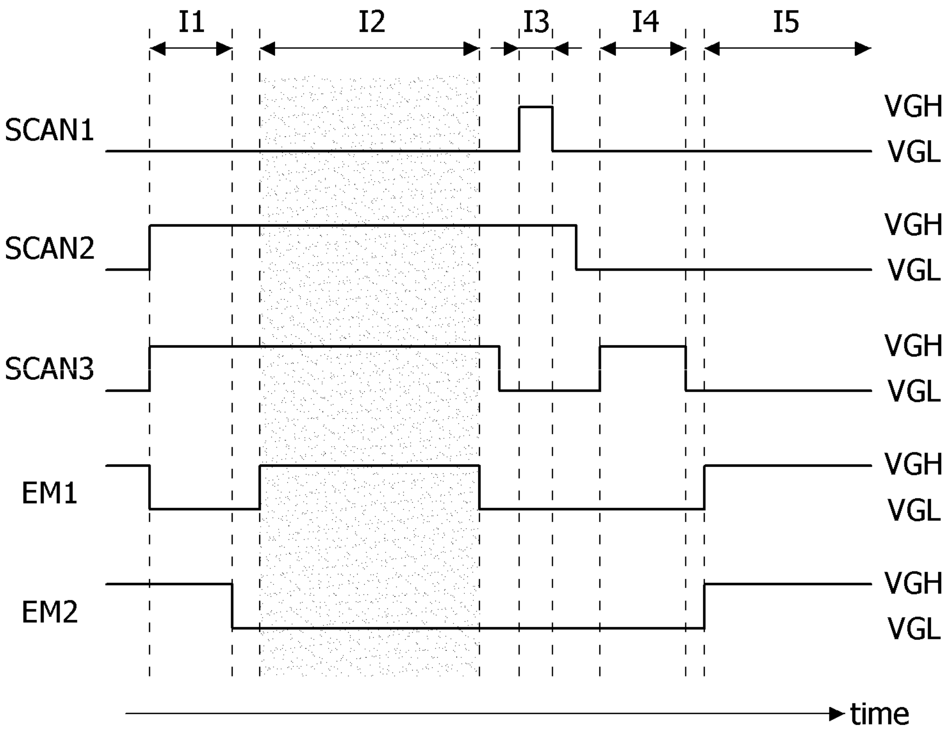

Referring to FIGS. 28A and 28B, during the second period I2, the threshold voltage Vth of the driving element DT is sensed and stored in the second capacitor C2. During the second period I2, the voltages of the second gate signal SCAN2, the third gate signal SCAN3, and the fourth gate signal EM1 are the gate-on voltage VGH. During the second period I2, the voltages of the first gate signal SCAN1 and the fifth gate signal EM2 are the gate-off voltage VGL. During the second period I2, the second, third, fourth, and fifth switch elements T12, T13, T14, and T15 are turned on, and the driving element DT is turned on. During the second period I2, the first and sixth switch elements T11 and T16 are turned off. During the second period I2, the driving element DT is turned off when the voltage of the second capacitor C2 reaches the threshold voltage Vth of the driving element DT.

At the end of the second period I2, the voltage of the second node G is the initialization voltage VINIT, and the voltage of the third node S is VINIT−Vth. Therefore, the voltage sampled and stored in the second capacitor C2 at the end of the second period I2 is the threshold voltage Vth of the driving element DT. At the end of the second period I2, the voltage of the fifth node n5 is the reference voltage VREF, so the light emitting element EL does not emit light during the second period I2. During the second period I2, the voltage of the first capacitor C1 is 0 [V].

Figure 29A:
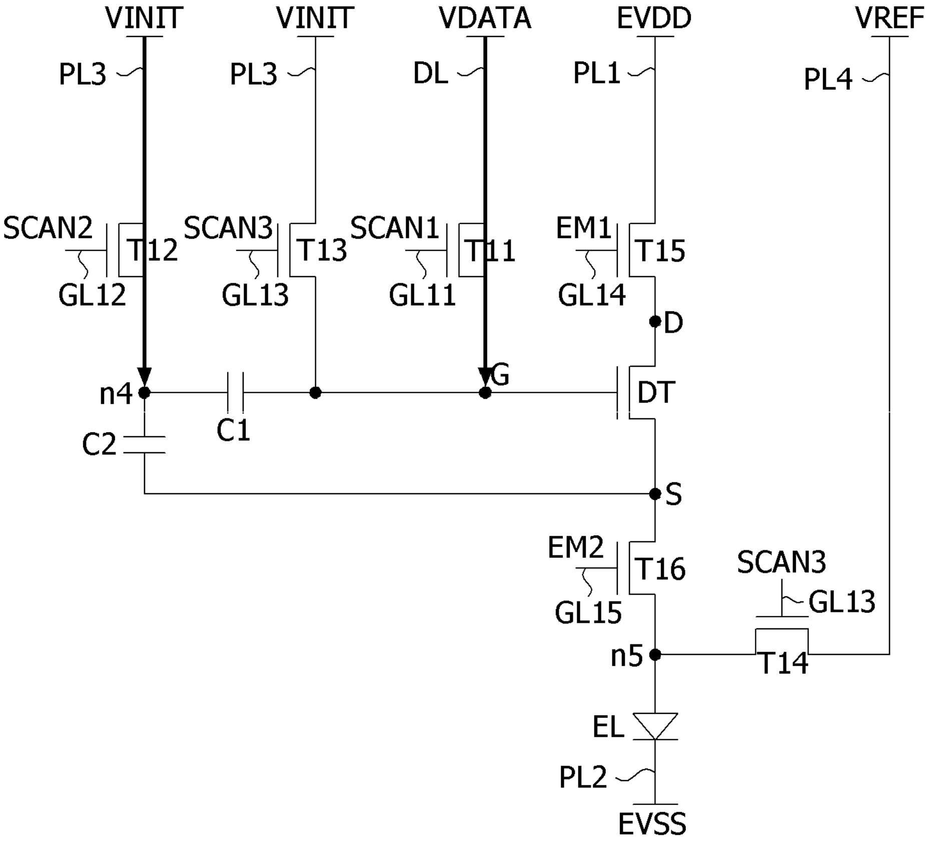

FIG. 29A is a circuit diagram illustrating the current flowing in the pixel circuit shown in FIG. 25 during the third period I3.

Figure 29B:
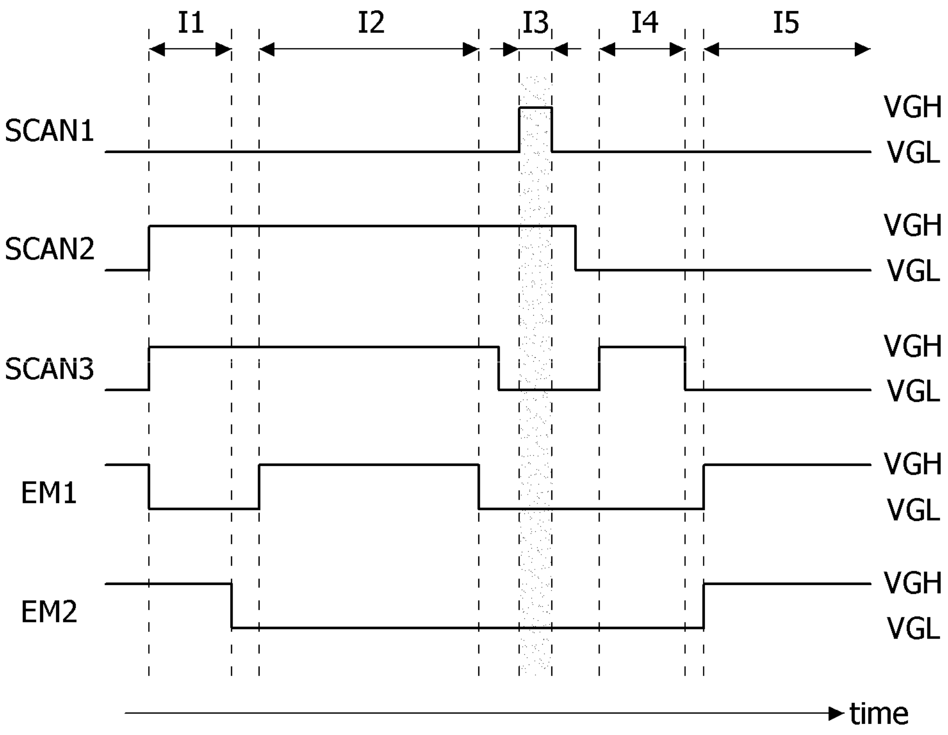

Referring to FIGS. 29A and 29B, during the third period I3, the data voltage VDATA of the pixel data is stored in the first capacitor C1. During the third period I3, the voltages of the first gate signal SCAN1 and the second gate signal SCAN2 are the gate-on voltage VGH. During the third period I3, the voltages of the third gate signal SCAN3, the fourth gate signal EM1, and the fifth gate signal EM2 are the gate off voltage VGL. During the third period I3, the first and second switch elements T11 and T12 are turned on, and the third, fourth, fifth, and sixth switch elements T13, T14, T15, and T16 are turned off. During the third period I3, the data voltage VDATA is applied to the second node G through the turned-on first switch element T11, and subsequently the initialization voltage VINIT is applied to the fourth node n4.

At the end of the third period I3, the voltage of the second node G is the data voltage VDATA and the voltage of the first capacitor C1 is VDATA−VINIT. At the end of the third period I3, the voltage of the third node S is VINIT−Vth, and the voltage of the second capacitor C2 is the threshold voltage Vth of the driving element DT. At the end of the third period I3, the gate-to-source voltage Vgs of the driving element DT is VDATA−VINIT+Vth.

Figure 30A:
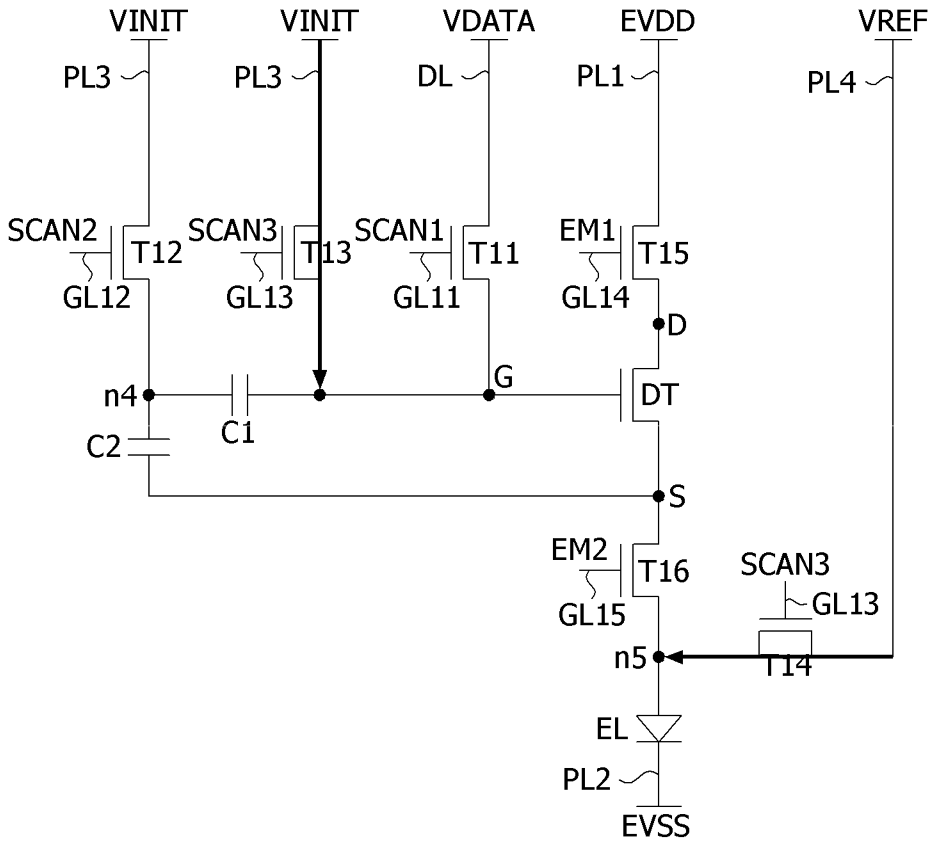

FIG. 30A is a circuit diagram illustrating the current flowing in the pixel circuit shown in FIG. 25 during the fourth period I4.

Figure 30B:
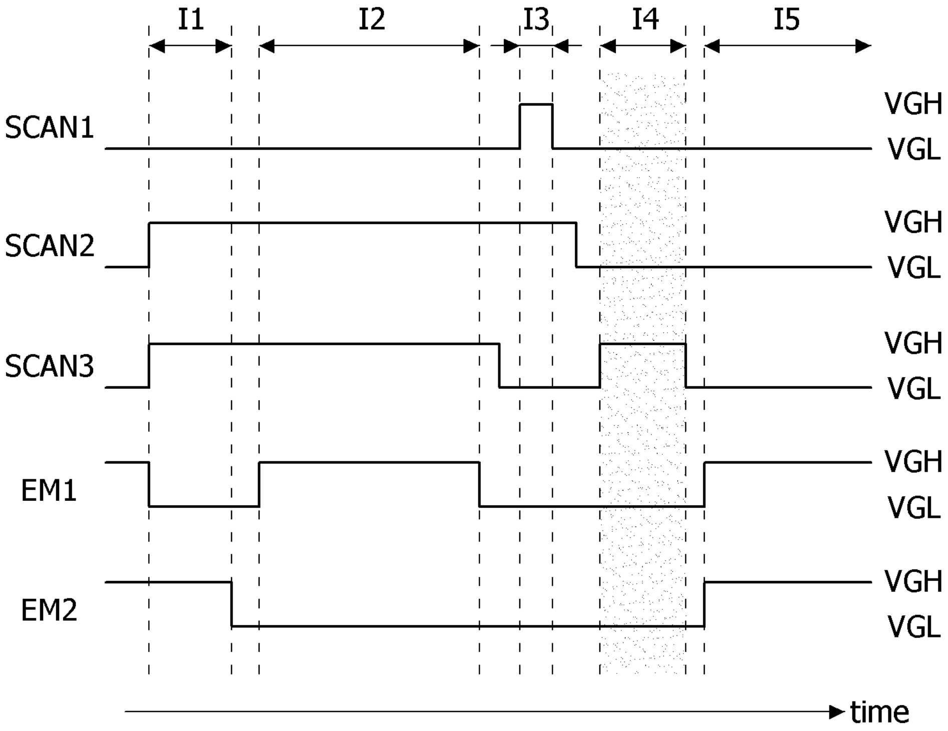

Referring to FIGS. 30A and 30B, an anode voltage of the light emitting element EL may be reset to the reference voltage VREF in the fourth period I4.

During the fourth period I4, the voltage of the third gate signal SCAN3 is the gate-on voltage VGH. During the fourth period I4, the voltages of the first gate signal SCAN1, the second gate signal SCAN2, the fourth gate signal EM1, and the fifth gate signal EM2 are the gate-off voltage VGL. Therefore, during the fourth period I4, the third and fourth switch elements T13 and T14 are turned on, and the first, second, fifth, and sixth switch elements T11, T12, T15, and T16 are turned off.

At the end of the fourth period I4, the voltage of the second node G is the initialization voltage VINIT and the voltage of the first capacitor C1 is VDATA−VINIT. At the end of the fourth period I4, the voltage of the third node S is VINIT−(VDATA−VINIT+Vth), and the voltage of the second capacitor C2 is the threshold voltage Vth of the driving element DT. At the end of the fourth period I4, the gate-to-source voltage Vgs of the driving element DT is VDATA−VINIT+Vth.

Figure 31A:
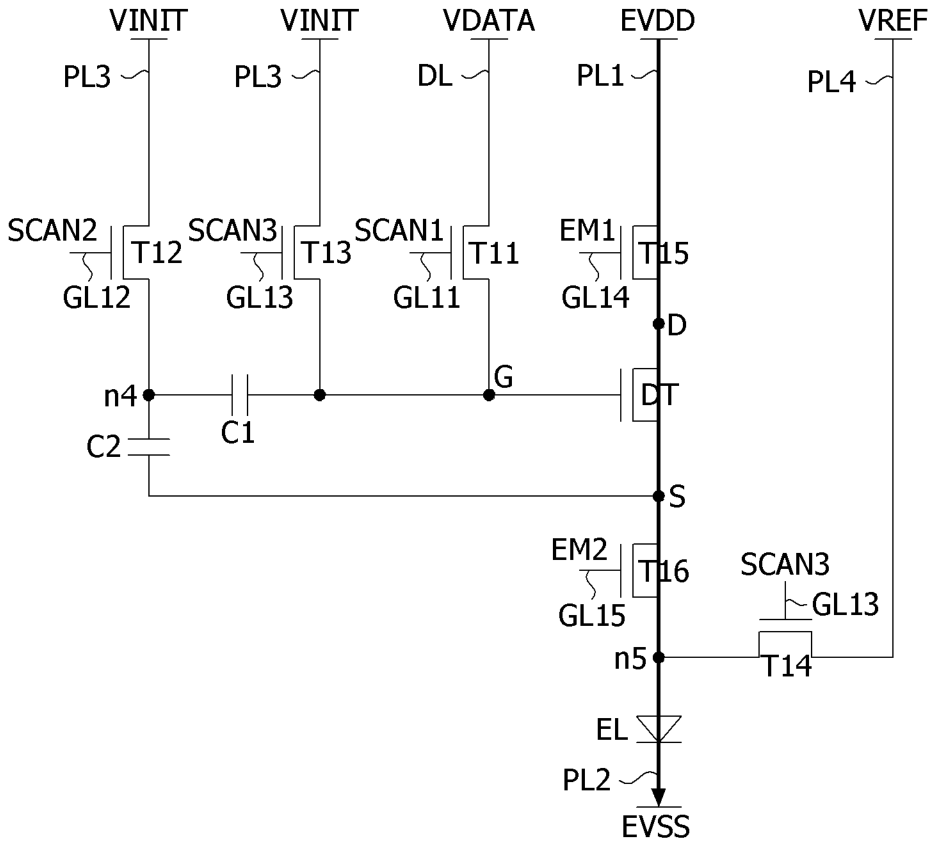

FIG. 31A is a circuit diagram illustrating the current flowing in the pixel circuit shown in FIG. 25 during the fifth period I5.

Figure 31B:
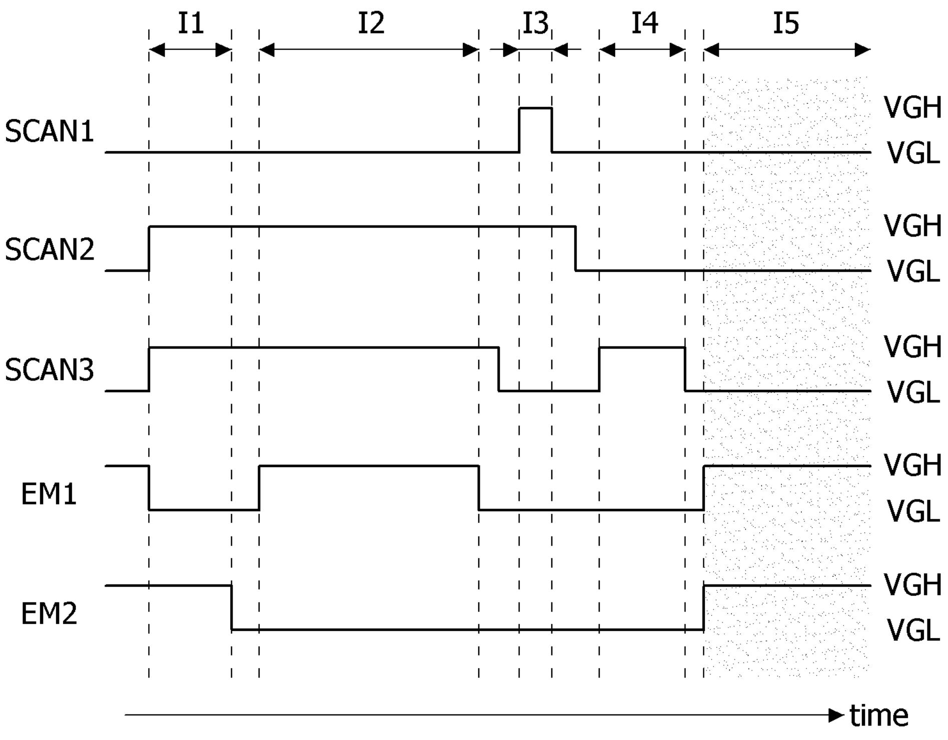

Referring to FIGS. 31A and 31B, during the fifth period I5, the driving element DT generates a current according to the gate-to-source voltage Vgs to drive the light emitting element EL. The light-emitting element EL may be emitted at a luminance corresponding to a gray scale value of the pixel data by the current flowing through the driving element DT.

During the fifth period I5, the voltages of the fourth and fifth gate signals EM1 and EM2 are the gate-on voltage VGH, and the voltages of the first, second, and third gate signals SCAN1, SCAN2, and SCAN3 are the gate-off voltage VGL. During the fifth period I5, the fifth and sixth switch elements T15 and T16 are turned on, and the first to fourth switch elements T11 to T14 are turned off. During the fifth period I5, the voltage of the second node G is VDATA−VINIT+Vth+Voled, and the voltage of the third node S is Voled. Here, Voled is the anode voltage when the light emitting element EL is emitting. Therefore, during the fifth period I5, the gate-to-source voltage Vgs of the driving element DT is VDATA−VINIT+Vth. During the fifth period I5, the voltage of the first capacitor C1 is VDATA−VINIT, and the voltage of the second capacitor C2 is the threshold voltage Vth of the driving element DT.

Figure 32:
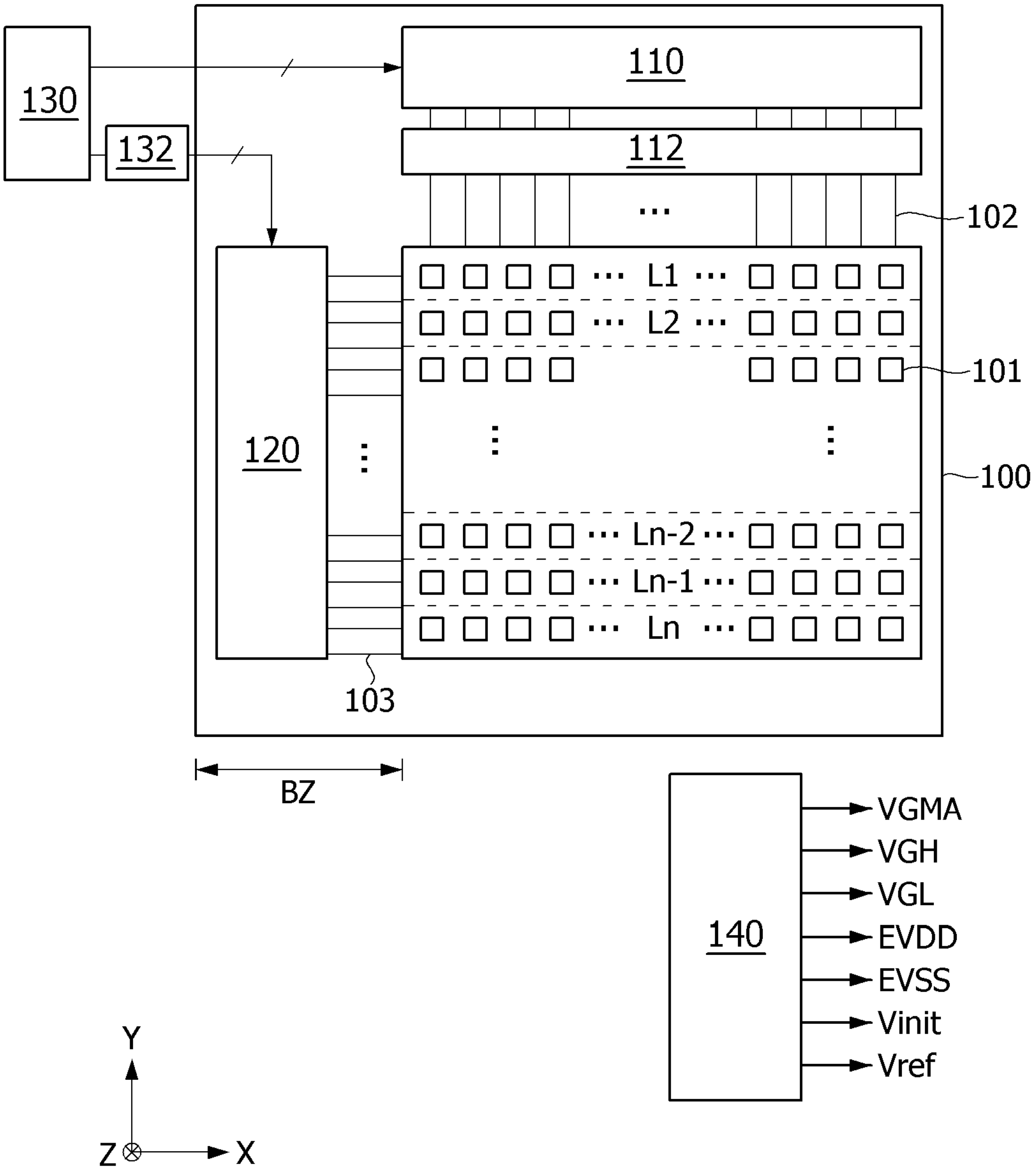
FIG. 32 is a block diagram illustrating a display device according to one embodiment of the present disclosure.
Figure 33:
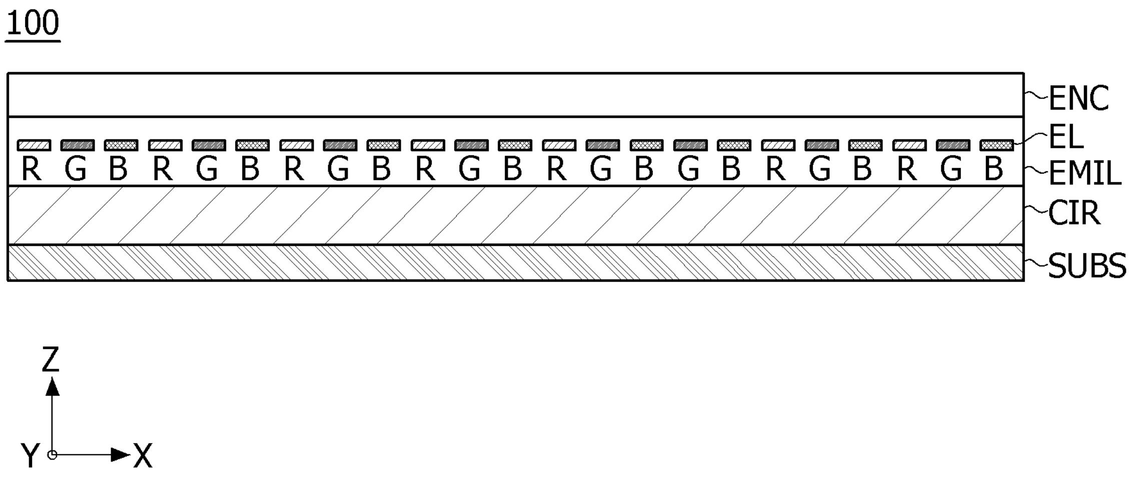
FIG. 33 is a cross-sectional view illustrating a cross-sectional structure of the display panel shown in FIG. 32.
Figure 34:
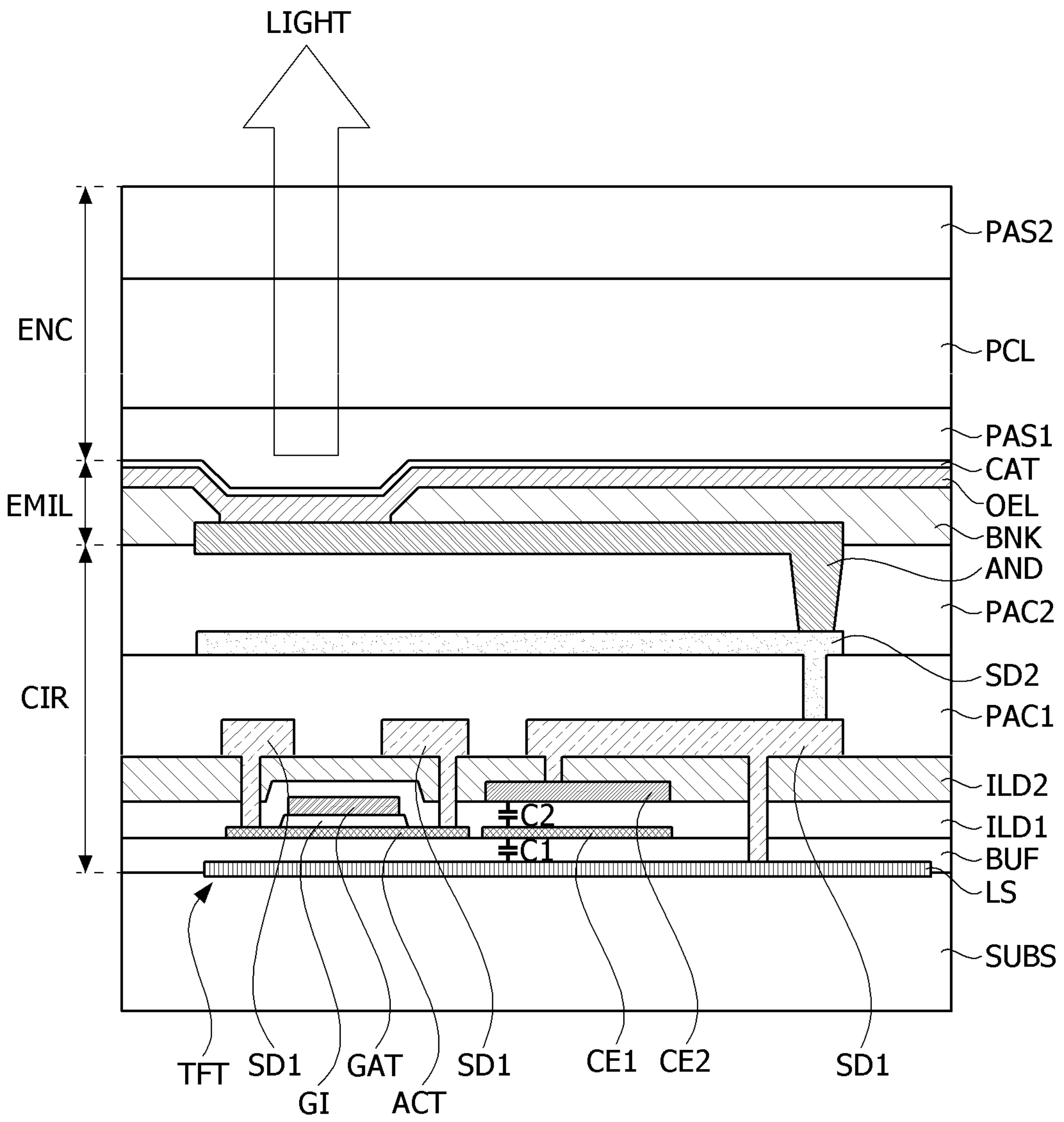
FIG. 34 is a cross-sectional view illustrating in detail the cross-sectional structure of a transistor and capacitors of the pixel circuit.

FIG. 32 is a block diagram illustrating a display device according to one embodiment of the present disclosure. FIG. 33 is a cross-sectional view illustrating a cross-sectional structure of the display panel shown in FIG. 32. FIG. 34 is a cross-sectional view illustrating in detail the cross-sectional structure of a transistor and capacitors of the pixel circuit.

Referring to FIGS. 32 to 34, the display device according to an embodiment of the present disclosure includes a display panel 100, a display panel driving circuit for writing pixel data to pixels of the display panel 100, and a power supply 140 for generating power necessary for driving the pixels and the display panel driving circuit.

The display panel 100 may be a panel having a rectangular structure with a length in the X-axis direction, a width in the Y-axis direction, and a thickness in the Z-axis direction. A display area of the display panel 100 includes a pixel array for displaying an input image thereon. The pixel array includes a plurality of data lines 102, a plurality of gate lines 103 intersected with the data lines 102, and pixels arranged in a matrix form. The display panel 100 may further include power lines commonly connected to the pixels. The power lines are connected to constant voltage nodes of the pixel circuits and supply a constant voltage necessary for driving the pixels 101 to the pixels 101.

Each of the pixels 101 may be divided into a red sub-pixel, a green sub-pixel, and a blue sub-pixel for color implementation. Each of the pixels may further include a white sub-pixel. Each of the sub-pixels may be implemented with any of the pixel circuits described above. Each of the pixel circuits is connected to the data lines, the gate lines, and the power lines.

The pixels may be arranged as real color pixels and pentile pixels. A pentile pixel may realize a higher resolution than the real color pixel by driving two sub-pixels having different colors as one pixel 101 through the use of a preset pixel rendering algorithm. The pixel rendering algorithm may compensate for insufficient color representation in each pixel with the color of light emitted from an adjacent pixel.

The pixel array includes a plurality of pixel lines L1 to Ln. Each of the pixel lines L1 to Ln includes one line of pixels arranged along a line direction (X-axis direction) in the pixel array of the display panel 100. Pixels arranged in one pixel line share the gate lines 103. Sub-pixels arranged in a column direction Y along the data line direction share the same data line 102. One horizontal period is a time obtained by dividing one frame period by the total number of pixel lines L1 to Ln.

The display panel 100 may be implemented with a non-transmissive display panel or a transmissive display panel. The transmissive display panel may be applied to a transparent display device in which an image is displayed on a screen and an actual object in the background is visible. The display panel 100 may be manufactured as a flexible display panel.

The cross-sectional structure of the display panel 100 may include a circuit layer CIR, a light emitting element layer EMIL, and an encapsulation layer ENC that are stacked on a substrate SUBS, as shown in FIGS. 33 and 34.

The circuit layer CIR may include a thin-film transistor (TFT) array including a pixel circuit connected to wirings such as a data line, a gate line, a power line, and the like, a de-multiplexer array 112, and a gate driver 120. The circuit layer CIR includes a plurality of metal layers insulated with insulating layers interposed therebetween, and a semiconductor material layer. All transistors formed in the circuit layer CIR may be implemented as an n-channel oxide TFT.

The light emitting element layer EMIL may include a light emitting element EL driven by the pixel circuit. The light emitting element EL may include a light emitting element of a red sub-pixel, a light emitting element of a green sub-pixel, and a light emitting element of a blue sub-pixel. The light emitting element layer EMIL may further include a light emitting element of white sub-pixel. The light emitting element layer EMIL in each of the sub-pixels may have a structure in which the light emitting element and a color filter are stacked. The light emitting elements EL in the light emitting element layer EMIL may be covered by multiple protective layers including an organic film and an inorganic film.

The encapsulation layer ENC covers the light emitting element layer EMIL to seal the circuit layer CIR and the light emitting element layer EMIL. The encapsulation layer ENC may also have a multi-insulating film structure in which an organic film and an inorganic film are alternately stacked. The inorganic film blocks permeation of moisture and oxygen. The organic film planarizes the surface of the inorganic film. When the organic layer and the inorganic layer are stacked in multiple layers, the movement path of moisture and oxygen becomes longer than that of a single layer, so that penetration of moisture and oxygen affecting the light emitting element layer EMIL may be effectively blocked.

A touch sensor layer, not shown, may be formed on the encapsulation layer ENC, and a polarizing plate or a color filter layer may be disposed thereon. The touch sensor layer may include capacitive touch sensors that sense a touch input based on a change in capacitance before and after the touch input. The touch sensor layer may include metal wiring patterns and insulating films forming the capacitance of the touch sensors. The insulating films may insulate a portion where the metal wiring patterns are intersected, and may planarize the surface of the touch sensor layer. The polarizing plate may improve visibility and contrast ratio by converting the polarization of external light reflected by metal of the touch sensor layer and the circuit layer. The polarizing plate may be implemented as a polarizer or a circular polarizer to which a linear polarizer and a phase retardation film are bonded. A cover glass may be adhered to the polarizing plate. The color filter layer may include red, green, and blue color filters. The color filter layer may further include a black matrix pattern. The color filter layer may replace the polarizing plate by absorbing a part of the wavelength of light reflected from the circuit layer and the touch sensor layer, and increase the color purity of an image reproduced in the pixel array.

The power supply 140 generates DC voltages (or constant voltages) necessary for driving the pixel array of the display panel 100 and the display panel driving circuit using a DC-DC converter. The DC-DC converter may include a charge pump, a regulator, a buck converter, a boost converter, and the like. The power supply 140 may generate constant voltages such as a gamma reference voltage VGMA, a gate-on voltage VGH, a gate-off voltage VGL, a pixel driving voltage EVDD, a cathode voltage EVSS, an initialization voltage VINIT, a reference voltage VREF, the anode reset Var, and the like by adjusting the level of the DC input voltage applied from a host system, which is not shown. The gamma reference voltage VGMA is supplied to the data drive 110. The gate-on voltage VGH and the gate-off voltage VGL are supplied to the gate driver 120. Voltages such as the pixel driving voltage EVDD, the cathode voltage EVSS, the initialization VINIT, and the reference voltage VREF, the anode reset voltage Var, and the like are supplied to the pixels 101 via the power lines commonly connected to the pixels 101.

The display panel driving circuit writes pixel data of an input image to the pixels of the display panel 100 under the control of the timing controller 130.

The display panel driving circuit includes the data driver 110 and the gate driver 120. The display panel driving circuit may further include a de-multiplexer array 112 disposed between the data driver 110 and the data lines 102.

The de-multiplexer array 112 sequentially supplies the data voltages outputted from channels of the data driver 110 to the data lines 102 using a plurality of de-multiplexers DEMUX. A de-multiplexer may include a multiple of switch elements disposed on the display panel 100. When the de-multiplexer is disposed between the output terminals of the data driver 110 and the data lines 102, the number of channels of the data driver 110 may be reduced. The de-multiplexer array 112 may be omitted.

The display panel driving circuit may further include a touch sensor driver for driving touch sensors. The touch sensor driver is omitted from FIG. 32. The data driver 110 and the touch sensor driver may be integrated into one drive IC (Integrated Circuit). In mobile devices or wearable devices, the timing controller 130, the power supply 140, the data driver 110, and the like may be integrated into one drive IC.

The display panel driving circuit may operate in a low-speed driving mode under the control of the timing controller 130. The low-speed driving mode may be set to reduce power consumption of the display device when an input image is not changed during a predetermined number of frames as a result of analyzing the input image. In the low-speed driving mode, the power consumption in the display panel driving circuit and the display panel 100 may be reduced by lowering a frame frequency at which the pixel data is written to the pixels, that is, a refresh rate, when still images are inputted for a predetermined time or longer. The low-speed driving mode is not limited to a case where the still image is inputted. For example, when the display device operates in a standby mode or when a user command or an input image is not inputted to the display panel driving circuit for a predetermined time or longer, the display panel driving circuit may operate in the low-speed driving mode.

The data driver 110 receives pixel data of the input image received as a digital signal from the timing controller 130 and outputs a data voltage. The data driver 110 converts the pixel data of the input image into a gamma compensated voltage at each frame period in a normal driving mode using a digital-to-analogue converter (DAC) and outputs the data voltage VDATA. The data driver 110 converts the pixel data of the input image into the gamma compensated voltage to output the data voltage VDATA using the DAC only in a refresh frame in the low-speed driving mode, and stops its operation in the hold frame to not output the data voltage. In the low-speed driving mode, the pixels 101 charge a pixel data voltage in the refresh frame and maintain a previous data voltage in a hold frame.

The gamma reference voltage VGMA is divided by a voltage divider circuit into the gamma compensated voltage for each gray scale. The gamma compensated voltage for each gray scale is provided to the DAC in the data driver 110. The data voltage VDATA is outputted through an output buffer in each of the channels of the data driver 110.

The gate driver 120 may be implemented as a gate in panel (GIP) circuit formed in the circuit layer CIR on the display panel 100 together with the TFT array of the pixel array and wirings. The gate driver 120 may be disposed on a bezel area BZ, which is non-display area of the display panel 100, or may be distributedly disposed in a pixel array in which an input image is reproduced.

The gate driver 120 may be disposed in the bezel area BZ on both sides of the display panel 100 with the display area of the display panel interposed therebetween and may supply gate pulses from the both sides of the gate lines 103 in a double feeding method. The gate driver 120 sequentially outputs pulses of the gate signals to the gate lines 103 under the control of the timing controller 130. The gate driver 120 may sequentially supply the gate signals to the gate lines 103 by shifting the gate signals using a shift register.

The gate driver 120 may include a first shift register that sequentially outputs the first gate signal INIT1, a second shift register that sequentially outputs the second gate signal INIT2, a third shift register that sequentially outputs the third gate signal SCAN, and a fourth shift register that sequentially outputs the fourth gate signal SENSE. The gate driver 120 may further include a fifth shift register that sequentially outputs the fifth gate signal EM1, and a sixth shift register that sequentially outputs the sixth gate signal EM2.

At least one of the shift registers in the gate driver 120 may be implemented as an edge trigger. The design concept for the gate driver 120 may be shared between the pixel circuits in the foregoing embodiments and the pixel circuits in which the gate signals are shared. In this case, the level shifter 132 may be shared in the driving circuits of the display panels which have different pixel designs, thereby allowing the same to be shared.

The timing controller 130 receives the digital video data DATA of the input image and timing signals synchronized therewith from the host system. The timing signal may include a vertical synchronization signal Vsync, a horizontal synchronization signal Hsync, a clock signal CLK, and a data enable signal DE. Because a vertical period and a horizontal period may be known by counting the data enable signal DE, the vertical synchronization signal Vsync and the horizontal synchronization signal Hsync may be omitted. The data enable signal DE has a cycle of one horizontal period (1H).

The host system may be one of a television (TV) system, a tablet computer, a notebook computer, a navigation system, a personal computer (PC), a home theater system, a mobile device, a wearable device, and a vehicle system. The host system may scale an image signal from a video source to match the resolution of the display panel 100 and transmit it to the timing controller 130 together with the timing signal.

The timing controller 130 may multiply the input frame frequency by i (i is a natural number) in a normal driving mode, so that it can control the operation timing of the display panel driving circuit at a frame frequency of the input frame frequency×i Hz. The input frame frequency is 60 Hz in a national television standards committee (NTSC) system and 50 Hz in a phase-alternating line (PAL) system.

The host system or timing controller 130 may vary the frame frequency to match the movement or the content characteristics of the input image.

The timing controller 130 reduces a frequency of a frame rate at which the pixel data is written to the pixels in the low-speed driving mode, compared to the normal driving mode. For example, the frame frequency at which the pixel data is written to the pixels in the normal driving mode may be 60 Hz or higher, e.g., any one of 60 Hz, 120 Hz, 144 Hz, 240 Hz, and the frame frequency in the low-speed driving mode may be set to a lower frequency than that in the normal driving mode. The timing controller 130 may reduce the driving frequency for the display panel driving circuit by reducing the frame frequency to lower the refresh rate of the pixels in the low-speed driving mode.

The timing controller 130 generates a data timing control signal for controlling the operation timing of the data driver 110, a control signal for controlling the operation timing of the de-multiplexer array 112, and a gate timing control signal for controlling the operation timing of the gate driver 120, based on the timing signals Vsync, Hsync, DE received from the host system. The timing controller 130 synchronizes the data driver 110, the de-multiplexer array 112, the touch sensor driver, and the gate driver 120 by controlling the operation timings of the display panel driving circuit.

The gate timing control signal generated from the timing controller 130 may be inputted to the shift register of the gate driver 120 through a level shifter 132. The level shifter may receive the gate timing control signal and generate a start pulse and a shift clock to provide them to the shift registers and the edge trigger of the gate driver 120.

Referring to FIG. 34, a circuit layer CIR includes a first metal pattern LS disposed on the substrate SUBS, a first insulating layer BUF disposed on the substrate SUBS to cover the first metal pattern LS, and an oxide semiconductor pattern disposed on the first insulating layer BUF.

The first metal pattern LS is disposed under a TFT and capacitors C1 and C2 to block light irradiated onto an active pattern ACT of the TFT, and serves as the lower electrode of the first capacitor C1. The oxide semiconductor pattern includes a first capacitor electrode CE1, which is plasma-treated to reduce its resistance, and the active pattern ACT of the TFT, which is not plasma-treated.

The first and second capacitors C1 and C2 are stacked by sharing the first capacitor electrode CE1, which is formed in the oxide semiconductor pattern. The first capacitor electrode CE1 has a lower resistance than the active pattern ACT of the TFT. The TFT may be one of the switch elements T1 to T7 and the driving element DT in the pixel circuit.

The circuit layer CIR includes a second insulating layer GI disposed on the active pattern ACT of the TFT, a second metal pattern GAT disposed on the second insulating layer GI, a third insulating layer ILD1 disposed on the first insulating layer BUF to cover the second insulating layer GI and the second metal pattern GAT and the oxide semiconductor pattern (ACT, CE1, a third metal pattern CE2 disposed on the third insulating layer ILD1, a fourth insulating layer ILD2 disposed on the third insulating layer ILD1 to cover the third metal pattern CE2, a fourth metal pattern SD1 disposed on the fourth insulating layer ILD2, a fifth insulating layer PAC1 disposed on the fourth insulating layer ILD2 to cover the fourth metal pattern SD1, a fifth metal pattern SD2 disposed on the fifth insulating layer PAC1, and a sixth insulating layer PAC2 disposed on the fifth insulating layer PAC1 to cover the fifth metal pattern SD2.

The first to fourth insulating layers BUF1, GI, ILD1, and ILD2 may be inorganic insulating layers comprising an oxide film or a nitride film. The fifth and sixth insulating layers PAC1 and PAC2 may be organic insulating layers.

The third metal pattern CE2 includes a second capacitor electrode. The fourth metal pattern SD1 includes the first and second electrodes of the TFT, and a jumper pattern connecting the third metal pattern CE2 to the first metal pattern LS. The jumper pattern is contacted to the first metal pattern LS through a contact hole penetrating the insulating layers BUF, ILD1, and ILD2. The fifth metal pattern SD2 is contacted to the jumper pattern through a contact hole penetrating the fifth insulating layer PAC1.

The first capacitor C1 may be formed between the first metal pattern LS and the first capacitor electrode CE1. The second capacitor C2 may be formed between the first capacitor electrode CE1 and the third metal pattern CE2.

A light emitting element layer EMIL includes an anode electrode AND disposed on the sixth insulating layer PAC2, a bank pattern BNK disposed on the sixth insulating layer PAC2 and covering the anode electrode AND except the light emitting region of the sub-pixel, an organic compound layer OEL of the light emitting element disposed on the light emitting region and the bank pattern BNK, and a cathode electrode CAT disposed on the organic compound layer OLE. The bank pattern BNK may be a seventh insulating layer formed as an organic insulating layer. The anode electrode AND is in contact with the fifth metal pattern SD2 through a contact hole penetrating the sixth insulating layer PAC2.

An envelope layer ENC includes multiple insulating layers covering the cathode electrode CAT of the light emitting element EL. The multiple insulating layers include an eighth insulating layer PAS1 covering the cathode electrode CAT, a ninth insulating layer PCL covering the eighth insulating layer PAS1, and a tenth insulating layer PAS2 covering the ninth insulating layer PCL. The eighth and tenth insulating layers PAS1 and PAS2 may be inorganic insulating layers, and the ninth insulating layer PCL may be an organic insulating layer.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pixel circuit comprising:

a driving element including a first electrode connected to a first node to which a pixel driving voltage is applied, a gate electrode connected to a second node, and a second electrode connected to a third node;

a first capacitor connected between the second node and a fourth node;

a second capacitor connected between the third node and the fourth node;

a light emitting element configured to be driven by a current flowing through the driving element;

a first switch element configured to be turned on in response to a gate-on voltage of a first gate signal to supply an initialization voltage to the fourth node;

a second switch element configured to be turned on in response to a gate-on voltage of a second gate signal to supply the initialization voltage to the second node;

a third switch element configured to be turned on in response to a gate-on voltage of a third gate signal to supply a data voltage to the second node; and a fourth switch element configured to be turned on in response to a gate-on voltage of a fourth gate signal, wherein the gate electrode of the driving element, one electrode of the first capacitor, one electrode of the second switching element, and one electrode of the third switching element are directly connected to the second node.

2. The pixel circuit of claim 1, wherein after a threshold voltage of the driving element is stored in the second capacitor, the data voltage is stored in the first capacitor.

3. The pixel circuit of claim 1, wherein the fourth gate signal is configured to supply a reference voltage to the third node or to a fifth node connected to an anode electrode of the light emitting element and a cathode voltage is applied to a cathode electrode of the light emitting element;

the first to fourth gate signals are configured to swing between the gate-on voltage and the gate-off voltage;

the first to fourth switch elements are turned off in response to the gate-off voltage;

the pixel driving voltage is higher than the maximum voltage of the data voltage;

the cathode voltage is lower than the minimum voltage of the data voltage;

the reference voltage is lower than the initialization voltage and higher than the cathode voltage;

the gate-on voltage is higher than the pixel driving voltage; and the gate-off voltage is lower than the cathode voltage.

4. The pixel circuit of claim 1, wherein the fourth gate signal is configured to supply a reference voltage to the third node or to a fifth node connected to an anode electrode of the light emitting element and a driving period of the pixel circuit includes:

a first period during which the pixel circuit is initialized;

a second period during which a threshold voltage of the driving element is stored in the second capacitor;

a third period during which the data voltage is stored in the first capacitor;

a fourth period during which the reference voltage is applied to the anode electrode of the light emitting element; and a fifth period during which the light emitting element is driven by a current from the driving element.

5. The pixel circuit of claim 4, wherein the first switch element includes a first electrode to which the initialization voltage is applied, a gate electrode to which the first gate signal is applied, and a second electrode connected to the fourth node;

the second switch element includes a first electrode to which the initialization voltage is applied, a gate electrode to which the second gate signal is applied, and a second electrode connected to the second node;

the third switch element includes a first electrode to which the data voltage is applied, a gate electrode to which the third gate signal is applied, and a second electrode connected to the second node; and the fourth switch element includes a first electrode connected to the anode electrode of the light emitting element, a gate electrode to which the fourth gate signal is applied, and a second electrode to which the reference voltage is applied.

6. The pixel circuit of claim 4, wherein a voltage of the first gate signal is the gate-on voltage during the first to third periods and the gate-off voltage during the fourth and fifth periods;

a voltage of the second gate signal is the gate-on voltage during the first and second periods and the gate-off voltage during the third to fifth periods;

a voltage of the third gate signal is the gate-on voltage synchronized with the data voltage during the third period and the gate-off voltage during the first, second, fourth, and fifth periods;

a voltage of the fourth gate signal is the gate-on voltage during the first and fourth periods and the gate-off voltage during the second, third, and fifth periods.

7. The pixel circuit of claim 4, further comprising:

at least one of a fifth switch element and a sixth switch element, wherein the fifth switch element is configured to be turned on in response to a gate-on voltage of a fifth gate signal to supply the pixel driving voltage to the first node;

the sixth switch element is configured to be turned on in response to a gate-on voltage of a sixth gate signal to connect the third node to the anode electrode of the light emitting element;

a voltage of the fifth gate signal is configured to be the gate-on voltage during the second, third, and fifth periods and the gate-off voltage during the first and fourth periods; and a voltage of the sixth gate signal is the gate-on voltage during the first, fourth, and fifth periods and the gate-off voltage during the second and third periods.

8. The display device of claim 7, wherein the fifth switch element includes a first electrode to which the pixel driving voltage is applied, a gate electrode to which the fifth gate signal is applied, and a second electrode connected to the first node; and the sixth switch element includes a first electrode connected to the third node, a gate electrode to which the sixth gate signal is applied, and a second electrode connected to the anode electrode of the light emitting element.

9. The pixel circuit of claim 1, wherein the fourth gate signal is configured to supply a reference voltage to the third node or to a fifth node connected to an anode electrode of the light emitting element and comprising:

a fifth switch element configured to be turned on in response to a gate-on voltage of a fifth gate signal to supply the pixel driving voltage to the first node;

a sixth switch element configured to be turned on in response to a gate-on voltage of a sixth gate signal to connect the third node to the fifth node; and a seventh switch element configured to be turned on in response to the gate-on voltage of the fourth gate signal to supply an anode reset voltage to the anode electrode of the light emitting element, wherein the fourth switch element supplies the reference voltage to the third node in response to the gate-on voltage of the fourth gate signal.

10. The display device of claim 9, wherein a cathode voltage is applied to a cathode electrode of the light emitting element;

the anode reset voltage is a constant voltage higher than the reference voltage by a voltage between 0 [V] and 1.5 [V];

the first to fourth gate signals swing between the gate-on voltage and the gate-off voltage; and each of the first to seventh switch elements is configured to be turned off in response to the gate-off voltage, wherein a driving period of the pixel circuit includes a first period, a second period, a third period, a fourth period, and a fifth period;

a voltage of the first gate signal is the gate-on voltage during the first to third periods and the gate-off voltage during the fourth and fifth periods;

a voltage of the second gate signal is the gate-on voltage during the first and second periods and the gate-off voltage during the third to fifth periods;

a voltage of the third gate signal is the gate-on voltage synchronized with the data voltage during the third period and the gate-off voltage during the first, second, fourth, and fifth periods;

a voltage of the fourth gate signal is the gate-on voltage during the first and fourth periods and the gate-off voltage during the second, third, and fifth periods;

a voltage of the fifth gate signal is the gate-on voltage during the second, third, and fifth periods and the gate-off voltage during the first and fourth periods; and a voltage of the sixth gate signal is the gate-on voltage during the fifth period and the gate-off voltage during the first to fourth periods.

11. A pixel circuit comprising:

a driving element DT including a first electrode connected to a first node, a gate electrode connected to a second node, and a second electrode connected to a third node;

a first capacitor C1 connected between the second node and the fourth node;

a second capacitor C2 connected between the third node and the fourth node;

a light emitting element EL configured to be driven by a current flowing through the driving element;

a first switch element T11 configured to be turned on in response to a gate-on voltage of a first gate signal SCAN1 to supply a data voltage to the fourth node;

a second switch element T12 configured to be turned on in response to a gate-on voltage of a second gate signal SCAN2 to supply an initialization voltage to the fourth node;

a third switch element T13 configured to be turned on in response to a gate-on voltage of a third gate signal SCAN3 to supply the initialization voltage to the second node;

a fourth switch element T14 configured to be turned on in response to the gate-on voltage of the third gate signal SCAN3 to supply a reference voltage to the fifth node;

a fifth switch element T15 configured to be turned on in response to a gate-on voltage of a fifth gate signal EM1 to supply a pixel driving voltage to the first node; and a sixth switch element T16 configured to be turned on in response to a gate-on voltage of a sixth gate signal EM2 to electrically connect the third node to the fifth node, wherein an anode electrode of the light emitting element is connected to the fifth node.

12. A display device comprising:

a display panel in which a plurality of data lines, a plurality of gate lines, a plurality of power lines, and a plurality of pixel circuits are disposed;

a data driver configured to output a data voltage of pixel data to the data lines; and a gate driver configured to sequentially supply gate signals to gate lines, wherein each of the pixel circuits includes:

a driving element including a first electrode connected to a first node to which a pixel driving voltage is applied, a gate electrode connected to a second node, and a second electrode connected to a third node;

a first capacitor connected between the second node and a fourth node;

a second capacitor connected between the third node and the fourth node;

a light emitting element configured to be driven by a current flowing through the driving element;

a first switch element configured to be turned on in response to a gate-on voltage of a first gate signal to supply an initialization voltage to the fourth node;

a second switch element configured to be turned on in response to a gate-on voltage of a second gate signal to supply the initialization voltage to the second node;

a third switch element configured to be turned on in response to a gate-on voltage of a third gate signal to supply a data voltage to the second node; and a fourth switch element configured to be turned on in response to a gate-on voltage of a fourth gate signal, wherein the gate electrode of the driving element, one electrode of the first capacitor, one electrode of the second switching element, and one electrode of the third switching element are directly connected to the second node.

13. The display device of claim 12, wherein after a threshold voltage of the driving element is stored in the second capacitor, the data voltage is stored in the first capacitor.

14. The display device of claim 12, wherein the driving element and the switch elements include an active pattern including an oxide semiconductor;

the first and second capacitors are stacked by sharing an oxide semiconductor pattern; and the resistance of the oxide semiconductor pattern shared by the first and second capacitors is lower than the resistance of the active pattern.

15. The display device of claim 12, wherein the fourth gate signal is configured to supply a reference voltage to the third node or to a fifth node connected to an anode electrode of the light emitting element and a cathode voltage is applied to a cathode electrode of the light emitting element;

the first to fourth gate signals swing between the gate-on voltage and the gate-off voltage;

the first to fourth switch elements are turned off in response to the gate-off voltage;

the pixel driving voltage is higher than the maximum voltage of the data voltage;

the cathode voltage is lower than the minimum voltage of the data voltage;

the reference voltage is lower than the initialization voltage and higher than the cathode voltage;

the gate-on voltage is higher than the pixel driving voltage; and the gate-off voltage is lower than the cathode voltage.

16. The display device of claim 12, wherein the fourth gate signal is configured to supply a reference voltage to the third node or to a fifth node connected to an anode electrode of the light emitting element and a driving period of the pixel circuit includes:

a first period during which the pixel circuit is initialized;

a second period during which a threshold voltage of the driving element is stored in the second capacitor;

a third period during which the data voltage is stored in the first capacitor;

a fourth period during which the reference voltage is applied to the anode electrode of the light emitting element; and a fifth period during which the light emitting element is driven by a current from the driving element.

17. The display device of claim 16, wherein a voltage of the first gate signal is the gate-on voltage during the first to third periods and the gate-off voltage during the fourth and fifth periods;

a voltage of the second gate signal is the gate-on voltage during the first and second periods and the gate-off voltage during the third to fifth periods;

a voltage of the third gate signal is the gate-on voltage synchronized with the data voltage during the third period and the gate-off voltage during the first, second, fourth, and fifth periods; and a voltage of the fourth gate signal is the gate-on voltage during the first and fourth periods and the gate-off voltage during the second, third, and fifth periods.

18. The display device of claim 16, wherein the each of the pixel circuits further includes:

at least one of a fifth switch element and a sixth switch element, wherein the fifth switch element is configured to be turned on in response to a gate-on voltage of a fifth gate signal to supply the pixel driving voltage to the first node;

the sixth switch element is configured to be turned on in response to a gate-on voltage of a sixth gate signal to connect the third node to the anode electrode of the light emitting element;

a voltage of the fifth gate signal is configured to be the gate-on voltage during the second, third, and fifth periods and the gate-off voltage during the first and fourth periods; and a voltage of the sixth gate signal is the gate-on voltage during the first, fourth, and fifth periods and the gate-off voltage during the second and third periods.

19. The display device of claim 12, wherein the fourth gate signal is configured to supply a reference voltage to the third node or to a fifth node connected to an anode electrode of the light emitting element, wherein the each of the pixel circuits further includes:

a fifth switch element configured to be turned on in response to a gate-on voltage of a fifth gate signal to supply the pixel driving voltage to the first node;

a sixth pixel switch element configured to be turned on in response to a gate voltage of a sixth gate signal to connect the third node to the fifth node; and a seventh switch element configured to be turned on in response to the gate-on voltage of the fourth gate signal to supply an anode reset voltage to the anode electrode, and wherein the fourth switch element supplies the reference voltage to the third node in response to the gate-on voltage of the fourth gate signal, wherein a cathode voltage is applied to a cathode electrode of the light emitting element;

the anode reset voltage is a constant voltage higher than the reference voltage by a voltage between 0 [V] and 1.5 [V];

the first to fourth gate signals swing between the gate-on voltage and the gate-off voltage;

each of the first to seventh switch elements is configured to be turned off in response to the gate-off voltage;

a driving period of the pixel circuit includes a first period, a second period, a third period, a fourth period, and a fifth period;

a voltage of the first gate signal is the gate-on voltage during the first to third periods and the gate-off voltage during the fourth and fifth periods;

a voltage of the second gate signal is the gate-on voltage during the first and second periods and the gate-off voltage during the third to fifth periods;

a voltage of the third gate signal is the gate-on voltage synchronized with the data voltage during the third period and the gate-off voltage during the first, second, fourth, and fifth periods;

a voltage of the fourth gate signal is the gate-on voltage during the first and fourth periods and the gate-off voltage during the second, third, and fifth periods;

a voltage of the fifth gate signal is the gate-on voltage during the second, third, and fifth periods and the gate-off voltage during the first and fourth periods; and a voltage of the sixth gate signal is the gate-on voltage during the fifth period and the gate-off voltage during the first to fourth periods.

20. The pixel circuit of claim 1, wherein the other electrode of the first capacitor, one electrode of the second capacitor and one electrode of the first switching element are directly connected to the fourth node.

* * * * *